United States Patent
Steinbauer et al.

(10) Patent No.: US 12,014,336 B2
(45) Date of Patent: Jun. 18, 2024

(54) METHODS FOR RECYCLING AND UPCYCLING CONSUMER ELECTRONICS WITH PLASTICS AND INTEGRATED BATTERIES

(71) Applicant: LOFT LABS, LLC, New York, NY (US)

(72) Inventors: Martin Steinbauer, New York, NY (US); Frederic Levy, New York, NY (US)

(*) Notice: Subject to any disclaimer, the term of this patent is extended or adjusted under 35 U.S.C. 154(b) by 0 days.

(21) Appl. No.: 18/370,380

(22) Filed: Sep. 19, 2023

(65) Prior Publication Data
US 2024/0095690 A1    Mar. 21, 2024

Related U.S. Application Data

(60) Provisional application No. 63/407,862, filed on Sep. 19, 2022.

(51) Int. Cl.
*B09B 3/80* (2022.01)
*G06Q 10/30* (2023.01)
(Continued)

(52) U.S. Cl.
CPC .............. *G06Q 10/30* (2013.01); *B09B 3/80* (2022.01); *G06Q 30/0207* (2013.01);
(Continued)

(58) Field of Classification Search
CPC ....... G06Q 10/30; G06Q 30/0207; B09B 3/80
See application file for complete search history.

(56) References Cited

U.S. PATENT DOCUMENTS 9,190,193 B1 * 11/2015 Reitzel ................. H01M 50/55
2013/0000532 A1 * 1/2013 Rabiner ................. F23G 7/006
110/346

(Continued)

FOREIGN PATENT DOCUMENTS

CN      115624214 A    1/2023
CN      218502939 U    2/2023
(Continued)

OTHER PUBLICATIONS

How Are Electronics Recycled? A Step-By-Step Guide; Blog on Great Lakes Electronics Corporation's website.
(Continued)

*Primary Examiner* — Scott C Anderson
(74) *Attorney, Agent, or Firm* — Caldwell Intellectual Property Law

(57) ABSTRACT

A system for initiating a recycling program of consumer electronic devices, wherein the system includes a collection device configured to collect a plurality of consumer electronic devices from users, a processing unit located within a permitted facility, communicatively connected to the collection device, wherein the processing unit is configured to disassemble each consumer electronic device of the plurality of consumer electronic devices into a plurality of base components through an electronic device disassembling process, wherein the plurality of base components includes a plurality of plastic components and at least a battery component, process the plurality of base components, wherein processing the plurality of base components includes disintegrating the plurality of plastic components into a plurality of granules and decomposing the at least one battery component into a plurality of electrochemical materials, and generate a recycled output using the processed plurality of base components.

15 Claims, 12 Drawing Sheets

(51) Int. Cl.
*G06Q 30/0207* (2023.01)
*B09B 101/02* (2022.01)
*B09B 101/16* (2022.01)
*B09B 101/75* (2022.01)

(52) U.S. Cl.
CPC ....... *B09B 2101/02* (2022.01); *B09B 2101/16* (2022.01); *B09B 2101/75* (2022.01); *G06Q 2220/00* (2013.01)

(56) References Cited

U.S. PATENT DOCUMENTS

| | | | | |
|---|---|---|---|---|
| 2019/0293478 | A1* | 9/2019 | Waite | G01G 23/18 |
| 2019/0318323 | A1* | 10/2019 | Rose, Sr. | G06Q 50/26 |
| 2021/0012605 | A1* | 1/2021 | Yamine | B65F 1/1484 |
| 2022/0207551 | A1* | 6/2022 | Mehrhoff | G06Q 30/0208 |
| 2022/0252674 | A1* | 8/2022 | Xu | G01R 31/3828 |
| 2022/0344737 | A1* | 10/2022 | Belharouak | H01M 10/54 |
| 2023/0009903 | A1* | 1/2023 | Daniel | F01K 3/186 |

FOREIGN PATENT DOCUMENTS

| | | | | |
|---|---|---|---|---|
| EP | 4173685 | A1 * | 5/2023 | A63F 13/34 |
| RU | 2788709 | C1 | 1/2023 | |
| RU | 2789543 | C1 | 2/2023 | |
| WO | WO-2022076904 | A1 * | 4/2022 | H01M 10/54 |

OTHER PUBLICATIONS

The complete e-waste recycling process Published on Jun. 21, 2021; Blog|Commercial Waste, Municipality Waste, Types of Waste, Recycle Track Systems (RTS website).

* cited by examiner

| 第二部分 成分/组成信息 Section 2 Composition/Information on Ingredient | | |
|---|---|---|
| 危险成分（化学名称）<br>Hazardous Ingredients<br>(Chemical Name) | 含量及含量百分比(%)<br>Concentration or concentration ranges (%) | CAS编号<br>CAS Number |
| 钴酸锂 Lithium Cobalt Oxide | 49.5 | 12190-79-3 |
| 聚偏氟乙烯 PVDF | 0.33 | 24937-79-9 |
| 铝 Aluminium | 7.6 | 7429-90-5 |
| 石墨 Graphite | 16.3 | 7782-42-5 |
| 丁苯橡胶 SBR | 0.05 | 9003-55-8 |
| 羧甲基纤维素 Carboxymethylcellulose | 0.28 | 9000-11-7 |
| 铜 Copper | 6.96 | 7440-50-8 |
| 镍 Nickel | 0.06 | 7440-02-0 |
| 六氟磷酸锂 Lithium Hexafluorophosphate | 10.96 | 21324-40-3 |
| 聚乙烯 Polyethylene | 4.03 | 9002-88-4 |
| 尼龙 Nylon | 3.93 | 24937-16-4 |

FIG. 8

METHODS FOR RECYCLING AND UPCYCLING CONSUMER ELECTRONICS WITH PLASTICS AND INTEGRATED BATTERIES

CROSS-REFERENCE TO RELATED APPLICATIONS

This application claims the benefit of priority of U.S. Provisional Patent Application Ser. No. 63/407,862, filed on Sep. 19, 2022, and titled "METHODS FOR RECYCLING AND UPCYCLING CONSUMER ELECTRONICS WITH PLASTICS AND INTEGRATED BATTERIES," which is incorporated by reference herein in its entirety.

FIELD OF THE INVENTION

The present invention generally relates to the field of recycling. In particular, the present invention is directed to methods for recycling and upcycling consumer electronics with plastics and integrated batteries.

BACKGROUND

Recycling is the process of converting waste materials into new materials and objects. Recycling is an alternative to conventional waste disposal that can save material, prevent the waste of potentially useful materials, and reduce the consumption of fresh raw materials. It is difficult to recycle consumer electronics that contain multiple material types. It is also difficult to recycle materials that have come in contact with certain toxic chemicals, such as nicotine.

SUMMARY OF THE DISCLOSURE

In an aspect, a system and method for initiating a recycling program of consumer electronic devices are described. The system includes a collection device configured to collect a plurality of consumer electronic devices from users, a processing unit located within a permitted facility, communicatively connected to the collection device, wherein the processing unit is configured to disassemble each consumer electronic device of the plurality of consumer electronic devices into a plurality of base components through an electronic device disassembling process, wherein the plurality of base components includes a plurality of plastic components and at least a battery component, process the plurality of base components, wherein processing the plurality of base components comprises disintegrating the plurality of plastic components into a plurality of granules and decomposing the at least one battery component into a plurality of electrochemical materials, and generate a recycled output using the processed plurality of base components.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8 depicts a chart of ingredients in batteries and how each component can be recycled;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

A method embodiment may include: collecting one or more consumer electronic devices; disassembling the one or more consumer electronic devices to separate plastic components from battery components; grinding up the separated plastic components into small units; generating building block materials from the small units; testing separated battery components; reusing one or more components of the tested battery is usable; and breaking down one or more components of the tested battery if not usable.

The present system provides an integrated approach of collection, disassembly, and re-use of batteries along with and grinding up of materials for re-use as material input. The disclosed system includes manufacturing steps and modes of treatment to make a different item from recycled materials. Recycled materials from integrated consumer electronics may be recycled into building materials and new batteries.

Figure 1:
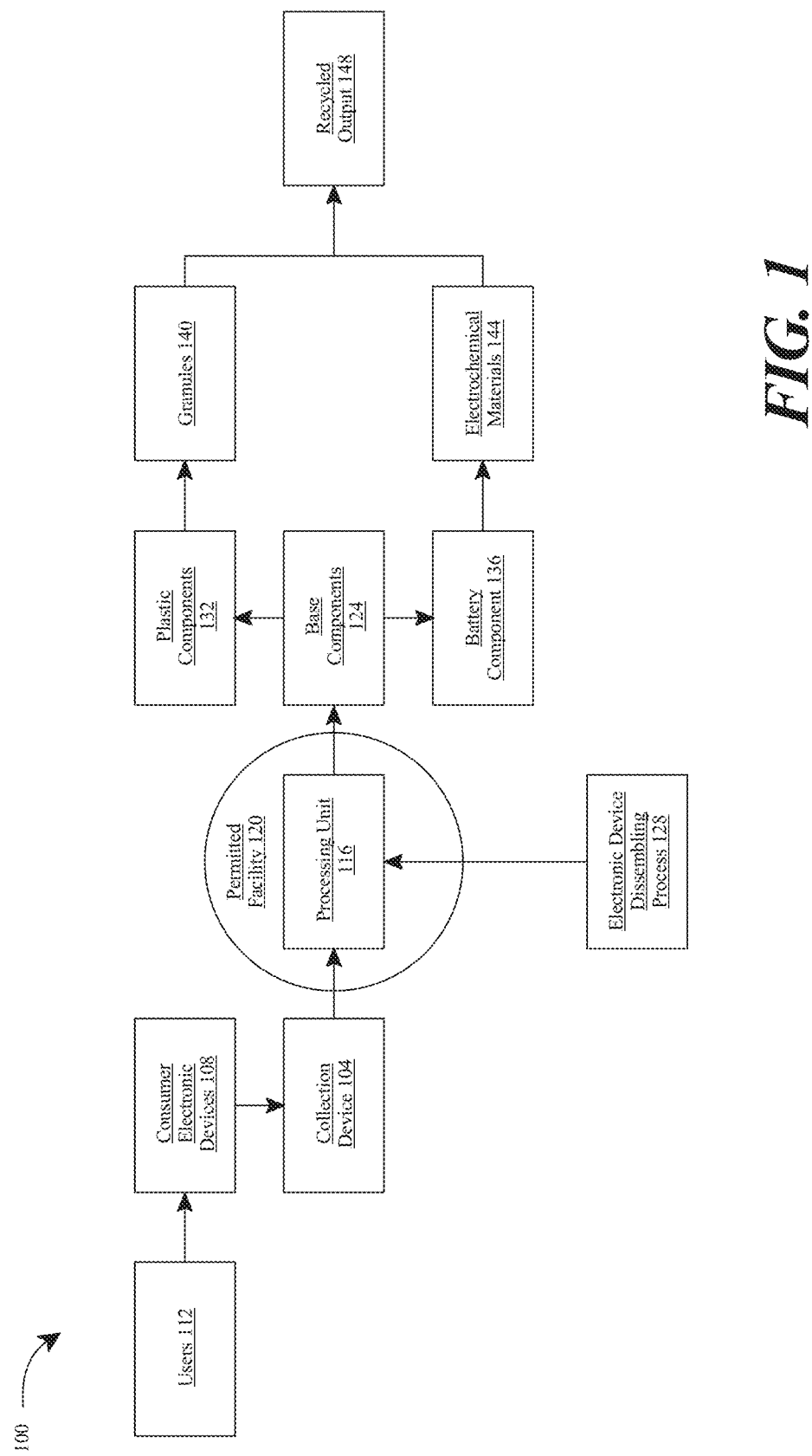
FIG. 1 shows an exemplary embodiment of a system for initiating a recycling program of consumer electronic devices.

Now referring to FIG. 1, a block diagram of an exemplary embodiment of a system 100 for initiating a recycling program of consumer electronic devices. As used in this disclosure, a "recycling program" refers to an organized strategy or initiative designed to collect, process, and convert waste materials into new products or raw materials, thereby reducing the need for virgin resources, minimizing environmental impact, and conserving energy. In an embodiment, recycling programs aim to reduce the amount of waste sent to landfills and incinerators, prevent pollution, and support sustainable practices by promoting the reuse of materials. In some cases, recycling programs may include any processing step and/or combination of processing steps as described in this disclosure below.

With continued reference to FIG. 1, system 100 includes a collection device 104 configured to collect a plurality of consumer electronic devices 108 from users 112. As used in this disclosure, a "collection device" is a device or apparatus used for the purpose of gathering, accumulating, or otherwise receiving a variety of consumer electronic devices 108 from users 112. In an embodiment, collection device 104 may serve as an initial point of contact e.g., receptacle or gathering point in recycling program as described herein, ensuring plurality of consumer electronic devices 108 are collected in an organized manner before they are sent for further processing as described below.

With continued reference to FIG. 1, in some cases, collection device 104 may be designed as a standalone unit, like a kiosk or bin, which may be placed in strategic locations such as an outlet e.g., local retail stores, electronic stores, community centers, recycling centers. In an embodiment, collection device 104 may be equipped with compartments or slots to accommodate different types of electronic devices as described herein.

With continued reference to FIG. 1, "consumer electronic devices (CED)," for the purpose of this disclosure, refers to any device that is designed for regular use by users 112 that is powered by electricity. "Users," as described herein, refers to individuals or entities who interact with, operate, or utilize plurality of CEDs 108. In a non-limiting example, users 112 may include individuals who purchase and use one or more CED. In another non-limiting example, users 112 may include individuals who avail or benefit from the recycling program as described herein such as the general public. In a further non-limiting example, users 112 may include employees or departments at permitted facility as described in detail below.

With continued reference to FIG. 1, in some cases, plurality of CEDs 108 may include a broad range of products, from handheld gadgets to larger appliances, intended for everyday use for entertainment, communication, office productivity, and/or the like. Plurality of CEDs 108 may be designed for purchase and utilization by the general public. In other cases, plurality of CEDs 108 may be characterized by their portability, user-friendliness, and functionality, often integrating advanced technologies to enhance user experience. In a non-limiting example, CEDs 108 may include aerosol delivery devices such as electronic cigarettes, inhalers, and air fresheners. Exemplary aerosol delivery device is described in detail below with reference to FIG. 3.

With continued reference to FIG. 1, other exemplary embodiments of CEDs 108 may include, without limitation, televisions, radios, gaming consoles, DVD players, home theater system, smartphones, landline phones, smartwatches, desktop computers, laptops, tablets, e-readers, MP3 players, camcorders, digital cameras, drones, microwaves, washing machines, refrigerators, smart glasses, VR headsets, and/or the like. As an ordinary person skilled in the art, upon reviewing the entirety of this disclosure, will be aware of various CEDs that may be collected by collection device 104 of system 100 as described herein.

With continued reference to FIG. 1, plurality of CEDs 108 may include electronic waste (E-waste), wherein "E-waste," for the purpose of this disclosure, refers to discarded electronic or electrical devices or parts/components thereof. In some cases, E-waste may include any CED as listed above that are no longer functional, wanted, or have reached the end of their useful life. Due to the presence of toxic substance (e.g., lead, mercury, cadmium, brominated flame retardants, and/or the like) in many electronic devices, improper disposal of e-waste may lead to environmental pollution and potential health risks.

With continued reference to FIG. 1, system 100 includes a processing unit 116 at a permitted facility 120, communicatively connected to collection device 104 as described herein. As used in this disclosure, a "processing unit" refers to an entity situated within permitted facility 120 that is equipped and capable of executing instructions, managing operations, and/or processing data related to recycling program as described herein. As non-limiting examples, entity may include a machine or trained professional. In an embodiment, processing unit 116 may include a central component in system 100, responsible for core processing steps as described in detail below that transform discarded electronics devices, e.g., plurality of CEDs 108 into reusable materials or new products.

With continued reference to FIG. 1, as described herein, "communicatively connected" refers to the establishment of a link or channel of communication between two or more components, devices, systems, or entities, in this case, collection device 104 and processing unit 116. Such connection may allow for a transfer, exchange, or relay of information, data, or signal between two parties, ensuring coordinated and informed operations as described below.

With continued reference to FIG. 1, in some cases, processing unit 116 may include one or more sophisticated machine designed for specific task involved in recycling program e.g., disassembling and processing plurality of CEDs. Alternatively, processing unit 116 may include a trained professional who possesses the skills and knowledge to manually disassemble devices and process plurality of CEDs 108.

With continued reference to FIG. 1, a "permitted facility," for the purpose of this disclosure, refers to a designated location or establishment that has been officially authorized, licensed, or approved by relevant regulatory bodies or authorities to carry out one or more processing steps as described herein. In some cases, permitted facility 120 may operate in compliance with local, regional, or national regulations and standards related to electronic waste management, ensuring that the facility adheres to best practices and meets the necessary safety and environmental standards.

With continued reference to FIG. 1, permitted facility 120 may undergo a rigorous evaluation process involving 1) submitting an application to relevant regulatory body detailing the facility's operations, equipment, and safety protocols; 2) undergoing inspections to ensure that the facility meets the required standards; 3) demonstrating the capability to handle CEDs in a manner that minimizes environmental impact and ensure worker safety; and 4) grant a permit or license to operate for the facility once all requirements have been met.

With continued reference to FIG. 1, exemplary permitted facility 120 may include, without limitation, E-stewards certified recyclers, responsible recycling (R2) certified facilities, waste electrical and electronic equipment (WEEE) authorized treatment facilities, state, or country-specific permitted facilities, among others.

With continued reference to FIG. 1, in some cases, processing unit 116 located within permitted facility 120 as listed above may include, without limitation, shredding machines, automated sorting lines, manual disassembly stations, chemical processing tanks, plastic granulating machines, metal recovery systems, and/or the like.

With continued reference to FIG. 1, in a non-limiting example, processing unit 116 may include one or more computing devices or processors e.g., a server. Computing device may include a processor communicatively connected to a memory. Exemplary embodiments of computing device may include, any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device.

With continued reference to FIG. 1, In some cases, network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication.

With continued reference to FIG. 1, in general, any network topology may be used. Information (e.g., data, software etc.) may be communicated to and/or from a computer and/or a computing device. Processing unit 116 may include a server having, but is not limited to, for example, a computing device or cluster of computing devices in a first location and a second computing device or cluster of computing devices in a second location. Server may include one or more computing devices dedicated to data storage, security, distribution of traffic for load balancing, and the like. Processing unit 116 may distribute one or more computing tasks as described below across a plurality of computing devices of different system components such as specialized machines within permitted facility 120 as described above, which may operate in parallel, in series, redundantly, or in any other manner used for distribution of tasks or memory between computing devices. Computing device of processing unit 116 may be implemented, as a non-limiting example, using a "shared nothing" architecture.

With continued reference to FIG. 1, processing unit 116 may be designed and/or configured to perform any method, method step, or sequence of method steps in any embodiment described in this disclosure, in any order and with any degree of repetition. For instance, computing device of processing unit 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks.

With continued reference to FIG. 1, processing unit 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, in some cases, communicative connection between collection device 104 and computing device of processing unit 116 at permitted facility 120 may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. In a non-limiting example, data related to collected plurality of CEDs 108 e.g., quantity, date of collection, user information, device condition, and/or the like may be transmitted, from collection device 104 to computing device of processing unit 116. Similarly, data such as server response, processing status, estimated completion time, and/or any potential issues or alerts may be sent from computing device of processing unit 116 to collection device 104 disposed at outlet.

With continued reference to FIG. 1, communicative connection described herein may further include electrically coupling or connecting at least an output of one device, component, or circuit to at least an input of another device, component, or circuit. For example, and without limitation, via a bus or other facility for intercommunication between collection device 104 and processing unit 116 as described herein. In some instances, the terminology "communicatively coupled" may be used in place of communicatively connected in this disclosure.

With continued reference to FIG. 1, in an embodiment, methods, devices, and/or systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=-R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, systems, devices, and/or methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-314," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 314 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, a "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, in a non-limiting embodiment, upon collection of at least one CED from Plurality of CEDs 108, system 100 may be configured to generate at least one token. As used in this disclosure, a "token" refers to a digital representation of user's contribution to the recycling initiative. In a non-limiting example, generation of at least a token may include provide a tangible recognition of users' eco-friendly actions, thereby encouraging continued participation. In some cases, contribution e.g., depositing at least one CED, may be quantified, by system 100, such as collection device 104 and/or processing unit 116 (and computing devices thereof) by calculating a reward as a function of detected quantity of deposited CEDs 108, CED types, deposition timestamp, location of collection device (e.g., outlet location), among others. In some cases, rewarding of at least a token to users 112 may introduce a gamification element to recycling process as described herein. Users 112 may accumulate rewarded token over time, potentially exchanging tokens for various benefits including, without limitation, discounts on certain products, priority services, or even monetary benefits.

With continued reference to FIG. 1, in some cases, at least a token may include a Non-Fungible Token (NFT). As used in this disclosure, an "NFT" are unique digital assets verified using blockchain technology as described in detail below with reference to FIG. 9. In an embodiment, each NFT may represent a specific recycled CED, capturing one or more attributes, history, origin, and/or any device related data of the specific recycled CED. The use of NFTs may ensure that every collected and/or recycled CED of plurality of CEDs 108 may be individually acknowledged (by processing unit 116). In a non-limiting example, users 112 may be able to view or showcase their collection of rewarded NFTs, reflecting their personal contribution to environmental conservation.

With continued reference to FIG. 1, rewarded NFTs may be posted on an immutable sequential listing associated with user. As used in this disclosure, an "immutable sequential listing" is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Additionally, or alternatively, NFTs may be traded e.g., sold or rented between users 112. In a non-limiting example, NFT may represent a recycling of a rare or vintage electronic device my become a sought-after digital collectible, further promoting the recycling program as described herein. Immutable sequential listing is described in further detail below with reference to FIG. 9.

With continued reference to FIG. 1, in a non-limiting example, collecting aerosol delivery device as described below may include receiving, retrieving, or otherwise recognizing a unique identifier of the collected aerosol delivery device (via near-filed communication technology [NFC]), and device manufacture data may be further retrieved by processing unit 116 based on the unique identifier. Using this specific example, the Consumer Electronic Devices 108 may include NFC-enabled devices with a unique ID may be brought back to a collection device 104, tapped on an NFC reader for the capturing of the unique ID, and placed in the collection receptacle for exchange of a deposit for returning the product. At least a token, including NFT as described above, may be generated as a function of unique identifier and/or device manufacture data, and distributed (e.g., send via various communication protocols described herein) to user devices affiliated with users 112. Unique identifier, NFC technology, and device manufacture data described herein may be consistent with any unique identifier, NFC technology, and object manufacture data disclosed in U.S. patent application Ser. No. 18/211,726, filed on Jun. 20, 2023, and entitled "APPARATUS AND METHOD FOR UNIQUE INDENTIFICATION OF AN OBJECT USING NEAR-FIFLED COMMUNICATION (NFC)," in which its entirety is incorporated herein by reference.

With continued reference to FIG. 1, processing unit 116 at permitted facility 120 is configured to disassemble each CED of plurality of CEDs 108 into a plurality of base components 124. As used in this disclosure, "base components" are fundamental, primary, or otherwise essential parts or elements that make up CED described herein. In an embodiment, base components 124 may include one or more components that are results of the initial disassembly or breakdown of a given CED such as aerosol delivery device as described in detail below with reference to FIG. 3.

With continued reference to FIG. 1, In some cases, each base component of plurality of base components 124 may include a specific function. In a non-limiting example, base components 124 may include circuit boards, structural units, display units, batteries, connectors and ports, semiconductors, optical components, speakers and microphones, and/or the like. Other exemplary based components are described in detail below with reference to FIG. 3.

With continued reference to FIG. 1, plurality of base components 124 is disassembled through an electronic device dissembling process 128. A "electronic device disassembling process," for the purpose of this disclosure, refers to a systematic procedure or set of steps undertaken to break down or dismantle CEDs 108 into base components 124. In some cases, electronic device disassembling process 128 may intake a single CED each time, ensuring precision and care in the disassembly of the CED. In other cases, multiple CEDs, such as a batch of similar CEDs or components thereof, may be processed simultaneously via electronic device disassembling process 128. In a non-limiting example, processing unit 116 may include an automated machine equipped with a plurality of sensors and robotic arms may be used to methodically disassemble plurality of CEDs 108 according to implemented electronic device disassembling process 128. In another non-limiting example, a trained personnel, such as a technician or an E-waste specialist, may be employed to manually disassemble plurality of CEDs 108 into plurality of base components 124. An exemplary electronic device disassembling process 128 and related processing steps are described in detail below with reference to FIG. 5.

With continued reference to FIG. 1, electronic device disassembling process 128 (besides manual disassembly) may include, without limitation, shredding, heat treatment, chemical treatment, desoldering, ultrasonic cleaning, magnetic separation, air separation, component testing, component salvaging, data destruction, and/or the like. As an ordinary person skilled in the art, upon reviewing the entirety of this disclosure, may be aware of various embodiments of electronic device disassembling process may be employed by processing unit 116 at permitted facility 120.

With continued reference to FIG. 1, disassembled plurality of base components 124 includes a plurality of plastic components 132. As used in this disclosure, "plastic components" refers to parts or elements of CEDs that are (primarily) made of plastic materials regardless of the size, shape, function, and/or the like. In a non-limiting example, plurality of plastic components 132 of CEDs 108 as described herein may include, but are not limited to, casings and housings, buttons and keypads, insulations (e.g., plastic coating, sheath, and/or the like), connectors and ports, display frames, mounts and stands, protective covers, internal components (e.g., plastic holders, clips, brackets, and/or any other internal components help keep other components in place), and/or any other accessories.

With continued reference to FIG. 1, exemplary plastic materials may include, without limitation, Polyethylene (PE, including Low-Density Polyethylene [LDPE], High-Density Polyethylene [HDPE], and Linear Low-Density Polyethylene [LLDPE]), Polypropylene (PP), Polyvinyl Chloride (PVC, including, Rigid PVC [uPVC] and Flexible PVC), Polystyrene (PS, including General Purpose Polystyrene [GPPS] and High Impact Polystyrene [HIPS]), Polyethylene Terephthalate (PET), Polybutylene Terephthalate (PBT), Polycarbonate (PC), Polyurethane (PU), Polyacrylonitrile (PAN), Polyvinylidene Fluoride (PVDF), Polyvinyl Alcohol (PVA), Polytetrafluoroethylene (PTFE), Polymethyl Methacrylate/Acrylic/Plexiglas (PMMA), Polyoxymethylene/Delrin (POM), Polyether Ether Ketone (PEEK), Polyphenylene Sulfide (PPS), Polyphenylene Oxide (PPO), Polysulfone (PSU), Polyimide (PI), Polyamide/Nylon (PA), Polyethylene Naphthalate (PEN), Polybutadiene (PBD), Polyisoprene (PIR), Polyvinyl Acetate (PVAc), Polyvinyl Butyral (PVB), Polychlorotrifluoroethylene (PCTFE), Polyvinylpyrrolidone (PVP), Ethylene-Vinyl Acetate (EVA), Ethylene Propylene Diene Monomer (EPDM), Thermoplastic Elastomers (TPE), Thermoplastic Polyurethane (TPU), Thermoplastic Olefin (TPO), Liquid Crystal Polymers (LCP), Polyaryletherketone (PAEK), Polyetherimide (PEI), among others.

With continued reference to FIG. 1, it should be noted that the plastic materials listed above are by no means exhaustive, as other specialized and blended plastic materials are available, such as, without limitation, acrylonitrile butadiene styrene (ABS), a blend of polycarbonate and ABS plastic (PC/ABS), and/or Poly Cyclohexylenedimethylene Terephthalate glycol-modified (PCT-G), and/or the like. As an ordinary person skilled in the art, upon reviewing the entirety of this disclosure, may be aware of various base components may be recognized, by processing unit 116, as plastic components 132. Other exemplary embodiments of plastic components 132 are described in detail below with reference to FIG. 3.

With continued reference to FIG. 1, disassembled plurality of base components 124 also includes at least a battery component 136. As used in this disclosure, a "battery component" is a part or element of a CED that stores energy in a chemical form and releases it as electrical energy to power the CED. In a non-limiting example, at least a battery component 136 may include one or more power sources such as one or more batteries that allow CEDs to function as desired. Batteries may power a plurality of CEDs 108 from tiny hearing aids to large electric vehicles. Battery component 136 may be configured to convert stored chemical energy into electrical energy through electrochemical reactions.

With continued reference to FIG. 1, in an embodiment, at least a battery component 136 may include an anode (i.e., negative electrode), a cathode (i.e., positive electrode), an electrolyte, and a separator. In a non-limiting example, at least a battery component 136 may include, without limitation, Lithium-ion (Li-ion) battery, Nickel-Cadmium (NiCd) battery, Nickel-Metal Hydride (NiMH) battery, Alkaline battery, Lead-Acid battery. In some cases, at least a battery component 136 may come in various shapes and sizes such as, without limitation, cylindrical cells (e.g., AA or 18650), flat pouch cells, prismatic cells and/or the like.

With continued reference to FIG. 1, additionally, or alternatively, at least a battery component 136 may include various means of protection mechanisms. For instance, and without limitation, modern batteries, such as Li-ion battery, may come with built-in protection circuits to prevent overcharging, over-discharging, and overheating, and/or the like to ensure safe operation in CEDs. In some cases, at least a battery component 136 may include positive and negative terminals, which provide electrical connection to CED. In other cases, battery components 136 may include different energy Density and/or capacity (i.e., amount of energy a battery can store relative to its volume or weight). In a non-limiting example, a battery component that has a higher energy density may store more power in a smaller or lighter package.

With continued reference to FIG. 1, exemplary embodiments of battery component 136 may include, without limitations, removable batteries, integrated batteries, flexible batteries, thin film batteries, among others. As an ordinary person skilled in the art, upon reviewing the entirety of this disclosure, will be aware of various types of battery component 136 may be disassembled from plurality of CEDs 108. At least a battery component 136 is further described below with reference to FIG. 3.

With reference to FIG. 1, processing unit 116 at permitted facility 120 is configured to process plurality of base components 124, including, without limitation, plurality of plastic components 132 and battery components 136 as described above. In an embodiment, processing plurality of base components 124 includes disintegrating plurality of plastic components 132 into a plurality of granules 140. As used in this disclosure, "disintegrating" means a processing step or a set of processing steps for reducing the physical size of plastic components 132 through mechanical, thermal, or otherwise chemical means to create smaller, uniform units or pieces refer to "granules." In some embodiments, disintegrating plastic components 132 into granules 140 may involve processes such as, without limitation, shredding, grinding, melting, or even using solvents, to break down larger plastic structures into more manageable particles with consistent sizes, facilitating further processing or recycling as described below.

With continued reference to FIG. 1, in some cases, granules 140 may include round or irregularly shaped particles or fragments resulting from the disintegration process as described above. In a non-limiting example, plurality of granules 140 may range in size from a few micrometers to several millimeters, depending on different processing method as described herein. In a non-limiting example, granules 140 may intended for injection molding may be smaller and more uniform than those meant for bulk recycling.

With continued reference to FIG. 1, in a non-limiting example, plurality of plastic components 132 may be shredded, using processing unit 116 including single-shaft shredder, dual or twin-shaft shredder, four-shaft shedder, hammermill, and/or the like to pulverize the input plastic components. Such process may reduce the size and volume of plastic components 132, making them easier to transport, store, or process further as described in further detail below.

With continued reference to FIG. 1, in some embodiments, processing plurality of plastic components 132 may include sorting, upon receiving plurality of plastic components 132, based on type such as, without limitation, PET, HDPE, PVC, and/or colors. This may be important since different type of plastic materials as described above may have different melting points and properties as described below with reference to FIG. 5. In some cases, sorting may be done manually; however, one or more automated systems e.g., systems including infrared sensors or flotation methods may be employed by processing unit 116 to sort plurality of plastic components 132. It should be noted that plurality of plastic components 132 do not have to be separated by type but are ground up into a mix.

With continued reference to FIG. 1, embodiments described herein may allow for base components 124 e.g., plurality of plastic components 132 with toxic chemicals (e.g., a residue of nicotine) in the context of plurality of aerosol delivery devices as plurality of CEDs 108 are being collected and recycled. In a non-limiting example, processing unit 116 may be configured to identify and segregate devices containing such toxic residues through various sensors, visual inspection systems, user prompts, and/or the like. Other potential contaminants or residues from aerosol delivery devices may include flavoring agents, solvents, or other chemicals as described in further detail below.

With continued reference to FIG. 1, processing plurality of base components 124 especially plastic components 132 may also include cleaning plurality of base components 124. In some cases, cleaning may be a pivotal step in the recycling process described herein, ensuring base components 124 such as plastic components 132 are free from contaminants, residues, and/or foreign materials as described above before it undergoes further processing. In a non-limiting example, plurality of plastic components 132 may undergo preliminary rinse to remove loose dirt, dust, and other superficial contaminants. In some cases, plurality of plastic components 132 may be immersed in a solution containing one or more detergents or surfactants to remove oily or greasy residues. Targeted cleaning may be initiated, by processing 116, for plastic components 132 that have specific contaminants, such as identified nicotine residues or other chemical residues as described above, in which processing unit 116 may release targeted cleaning agents or solvents to neutralize or remove these specific contaminants (without harming plastic materials).

With continued reference to FIG. 1, alternatively, thermal cleaning may be employed for more stubborn contaminants, for example, and without limitation, plurality of plastic components 132 may be subjected to controlled heating, thereby softening, or melting certain residues. Ultrasonic cleaning may also be used by processing unit 116, as an advanced cleaning method, in which ultrasonic waves in a cleaning solution create micro-bubbles. When these bubbles collapse, a strong cleaning action (i.e., cavitation) may be produced that can remove microscopic contaminants from plastic component surface (even intricate geometries or head-to-reach areas). Subsequent rinsing (with water) and drying (e.g., air drying, thermal draying, vacuum drying, and/or the like) may ensure the complete removal of loosened contaminants and moisture from plastic components 132.

With continued reference to FIG. 1, further, processing unit 116 at permitted facility 120 may further include a mechanical device or machine used to shape, form, and/or produce materials by pushing or forcing input materials through an inlet (e.g., a die or nozzle) such as, without limitation, an extruder, configured to melt and form plurality of plastic components 132 into a consistent shape granules 140. Disintegrating plurality of plastic components 132 may further include pelletizing, i.e., cutting the produced material into granules 140 that may be then cooled and solidified. Plurality of granules 140 may be used as raw material for producing recycled output as described below.

With continued reference to FIG. 1, additionally, processing plurality of base components 124 further includes decomposing at least one battery component 136 into a plurality of electrochemical materials 144. As used in this disclosure, "decomposing" means breaking down at least one battery components 124 into its constituent materials through a combination of mechanical, chemical, and/or thermal process such as, without limitation, hydro-to-cathode, as described in detail below. In some cases, electrochemical materials may include valuable metals, without limitation, Lithium, Cobalt, Nickel, Manganese, copper, aluminum, lead, and/or the like. In another non-limiting example, electrochemical materials 144 may further include electrolytes and separators. Decomposing at least one battery component 136 is described in further detail with reference to FIG. 6.

With continued reference to FIG. 1, processing unit 116 at permitted facility 120 is configured to generate a recycled output 148 using processed plurality of base components 124 as described above. As used in this disclosure, a "recycled output" refers to a product or material that is derived from "recyclets" such as, without limitation, plurality of granules 140 and electrochemical materials 144 as described above. Exemplary embodiments of recycled output 148 may include, without limitation, recycled plastic pellets, reclaimed metals, compost, recycled paper, refurbished electronics, recycled rubber, reprocessed glass, and/or the like. As an ordinary person skilled in the art, upon reviewing the entirety of this disclosure, may be aware of various recycled output 148 generated by processing unit 116 at permitted facility 120.

With continued reference to FIG. 1, in an embodiment, recycled output 148 may be tangible; for instance, and without limitation, recycled output may include a newly molded plastic product made from plurality of granules 140, a refurbished electronic device using reclaimed electrochemical materials, or even a composite material that combines multiple recyclets to from a new type of building material for fabric. In a non-limiting example, recycled output 148 generated by processing unit 116 may include a plurality of building material such as roof shingles and bricks. In another non-limiting example, recycled output 148 generated by processing unit 116 may include one or more new batteries, as described in detail below with reference to FIG. 6.

With continued reference to FIG. 1, in another embodiment, recycled output 148 may be intangible; for instance, and without limitation, data related to recycled output 148 may include saved energy or reduced carbon footprint resulting from the recycling process as described herein compared to the production of new materials. In a non-limiting example, recycled output 148 may represent an environmental benefits and efficiencies gained from the said recycling process, such as reduced greenhouse gas emissions, conservation of natural resources, or the prevention of waste accumulation in landfills.

Figure 2:
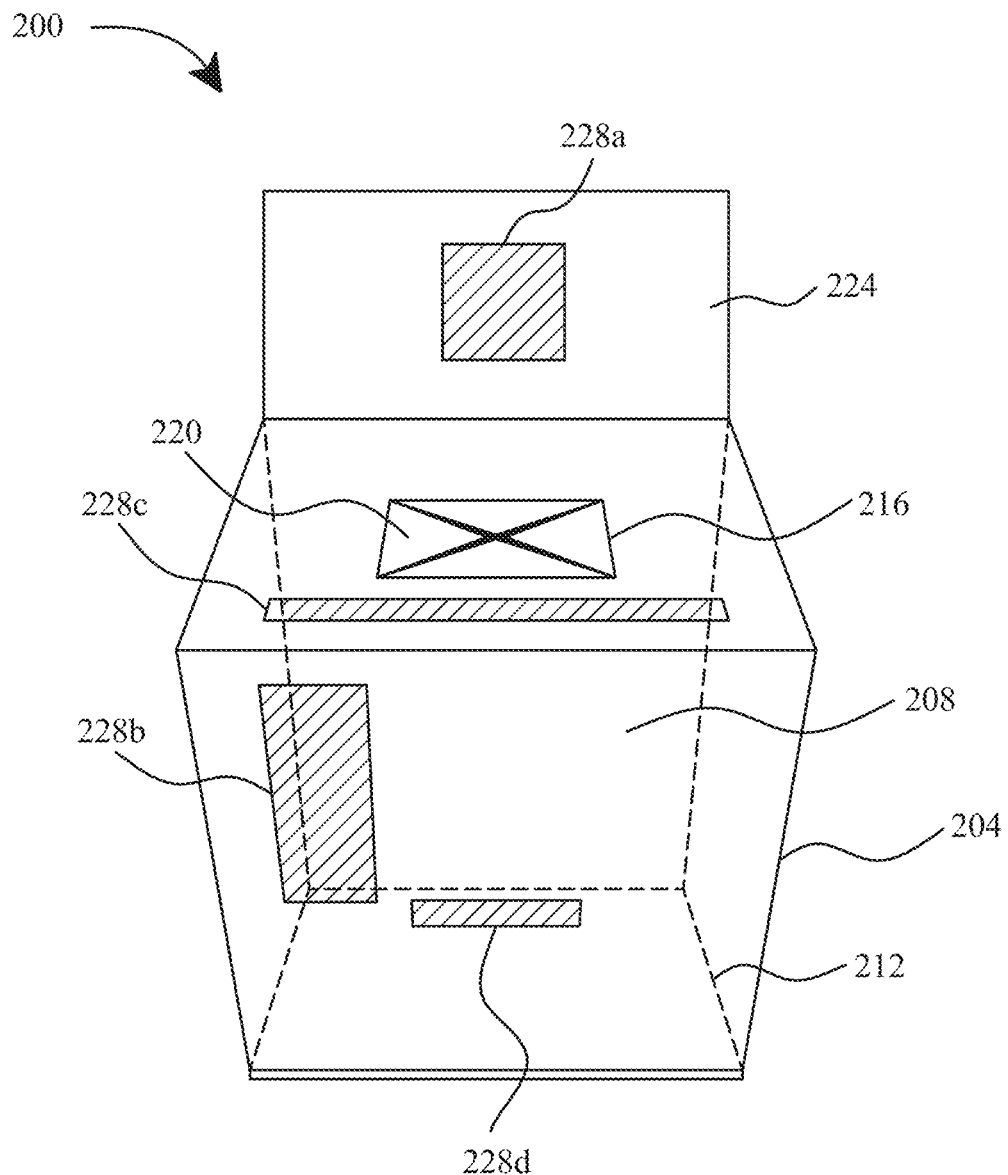
FIG. 2 depicts an exemplary embodiment of a collection device.

Now referring to FIG. 2, an exemplary embodiment of a collection device 200 is illustrated. Collection device 200 may include any collection device as described above with reference to FIG. 1. In an embodiment, Collection device may include a housing 204 having an enclosed volume 208. As used in this disclosure, a "housing" is to a main structural component or enclosure of collection device 200 that provides a contained space or volume, refers to as an "enclosed volume," to accommodate and store plurality of CEDs 108 deposited by users 112. In some cases, housing 204 may include a primary container or shell of collection device 200, configured to receive and store plurality of CEDs 108.

With continued reference to FIG. 2, in some cases, housing 204 may come in various shapes depending on one or more design requirements, designated receiving items, and/or intended location of collection device 200. In a non-limiting example, shape of housing 204 may include rectangular, cylindrical, or other custom designs to fit specific spaces or aesthetics. In some cases, the shape may be influenced by types and sizes of CEDs 108 collection device 200 intended to collect. In some cases, collection device 200 may include a box-like housing as shown in FIG. 2 with cm in length, 20 cm in width, and 30 cm in height. It should be noted that the size of the collection device 200 may vary, for example, and without limitation, a collection device meant for a busy urban area may have a larger housing to accommodate a higher volume of deposits, while a device for a smaller community or a location with less space available may be more compact.

With continued reference to FIG. 2, housing 204 may feature a smooth finish for easy cleaning or a textured surface for aesthetic or other functional reasons, such as, without limitation, grips, stands, and/or the like for easy carrying and transportation. In other cases, collection device 200 may be a one-time use collection device for situations where temporary solution for collecting plurality of CEDs 108 is required. In such an embodiment, housing 204 may be primarily made from materials such as, without limitation, cardboard, hard paper, or similar biodegradable or recyclable materials, offering an eco-friendly and cost-effective solution for short-term collection needs. If flammable materials are used for the make up of housing 204 and the CEDs 108 have a risk of battery exposure, a special chemical coating or material coating may be used inside of housing 204 to mitigate fire hazard. Alternatively, non-flammable materials may be used instead.

Such collection device 200 may have a foldable design, wherein the collection device 200 may be folded into a more compact shape, for purposes of storage, transportation, and/or space-saving.

With continued reference to FIG. 2, additionally, or alternatively, housing 204 may include one or more ventilations, depending on the type of devices being collected. In some cases, ventilations may include, without limitation, slots or holes, configured to prevent any buildup of heat or gases from stored CEDs 108. Further, housing 204 may include a base 212, wherein the base 212 may be weighted or designed with stabilizing features to ensure collection device 200 remain upright and stable, especially in outdoor settings where collection device 200 may be exposed to various environmental conditions.

With continued reference to FIG. 2, collection device 200 may include at least an aperture 216 located on at least a portion of the housing. As used in this disclosure, an "aperture" refers to an opening, gap, or otherwise a hole located on at least a portion of housing 204 as described above. In an embodiment, at least an aperture 216 may be configured as a primary entry point or point of access for users 112 to deposit plurality of CEDs 108 into collection device 200. In some cases, aperture 216 may include a slit e.g., a long narrow opening suitable for depositing thin devices such as, without limitation, smartphones, tablets, or e-readers. In some cases, aperture 216 may include a hatch that may be lifted or slid open, allowing for the deposition of bulkier devices such as, without limitation, cameras, portable gaming consoles, and/or the like. In some cases, aperture 216 may include a funnel or chute-like opening that may guide deposited CEDs 108 into enclosed volume 208, ensuring CEDs 108 land safely and/or potentially arranged efficiently inside.

With continued reference to FIG. 2, collection device 200 may include a one-way aperture, wherein such aperture may be designed with a closure mechanism 220 (e.g., flaps or rollers) configured to only allow plurality of CEDs 108 such as, without limitation, plurality of aerosol delivery devices as described below, to be deposited but prevents them from being retrieved. In a non-limiting example, closure mechanism 220 may be disposed adjacent to at least an aperture 216, ensuring that once CEDs 108 are deposited, they remain securely inside housing 204. In such embodiment, aperture 216 with closure mechanism 220 may be configured to prevent unauthorized access to enclosed volume 208 while allowing plurality of CEDs 108 to be deposited through at least an aperture 216.

With continued reference to FIG. 2, another exemplary embodiment of at least an aperture 216 may include a meshed aperture, wherein the meshed aperture is an opening covered with a mesh or grille, allowing smaller devices to be inserted while preventing the deposition of larger unintended CEDs. In a non-limiting example, collection device 200 with such meshed aperture may be configured for collecting wearable tech such as smart watches and/or the like.

With continued reference to FIG. 2, in some embodiments, at least an aperture 216 may be dimensioned to allow an insertion of plurality of CEDs 108 such as, without limitation, aerosol delivery devices into enclosed volume 208, while preventing larger CEDs from being deposited. In a non-limiting example, at least an aperture may be rectangular, 10 cm long, and 10 cm wide. In a non-limiting example, a flap may be cut on three sides, leaving one side (the base) attached to at least a portion (side) of housing 204. In case where collection device 200 is one-time use collection device that made of cardboard, such flap may be created by directly cutting at least a portion of housing 204 in an intersectional manner. When aerosol delivery device and/or any other CEDs are pushed against the flap, it bends inwards, allowing devices to pass through. Once devices are inside and no longer exerting pressure, flap may return to original position due to the material of the flat e.g., cardboard's natural rigidity, preventing deposited devices from being retrieved by users 112.

With continued reference to FIG. 2, in some cases, to ensure flap maintains its shape and doesn't wear out quickly, edges of closure mechanism 220 may be reinforced. In a non-limiting example, reinforcement may be done using additional strips of cardboard, type or even a thin plastic edge. In some cases, the base of flap may be also reinforced in a similar manner to prevent tearing from repeated use.

With continued reference to FIG. 2, in another non-limiting example, closure mechanism 220 may include a plurality of anti-reverse barbs or teeth. In some cases, a plurality of small (carboard) "teeth" or barbs may be added inside at least one aperture 216. These plurality of anti-reverse barbs or teeth may be angled in such a way that they bend easily to allow one or more CEDs in but resist any attempt to pull CEDs out. In a non-limiting example, if a user tries to retrieve a device, teeth may dig into the device, preventing its removal.

With continued reference to FIG. 2, additionally, or alternatively, during collection device is not actively being used, a lid component 224 (i.e., a movable or detachable part of collection device 200) pivotally attached to housing 204 may be configured to cover at least an aperture 216. This function may be selective, meaning that the lid component may selectively cover and uncover at least an aperture 216. In some cases, when at least an aperture 216 is covered by lid component 224, a secure containment of plurality of CEDs 108 within enclosed volume 208 may be enabled. In a non-limiting example, lid component 224 may include a simple fold-down flap. In some cases, lid component 224 may operate on a hinge mechanism, allowing it to swing open and closed.

With continued reference to FIG. 2, in some cases, lid component 224 may be manually operated by users 112, for example, and without limitation, trained employee at disposed outlet, to cover or uncover aperture 216. Tape and/or sticker seal may be used, in some cases, to further secure the containment of plurality of CEDs 108. In other cases, lid components 224 may include a slide-over piece and the like. In some cases, additional locking mechanism may be included, by lid component 224, for example, and without limitation, to lock collection device 200, preventing any unauthorized access to contents in collection device 200.

With continued reference to FIG. 2, further, collection device 200 may include any computing device as described herein, such as, without limitation, a processor or a controller, configured to automatically manage, monitor, and/or optimize one or more components of collection device 200 and/or the collection process as described above. In a non-limiting example, processor within collection device 200 may be programmed to automatically open and or close at least an aperture 216 by configuring closure mechanism 220 and/or lid component 224 to switch between opening state and closing state. In some embodiments, computing device within collection device 200 may be communicatively connected to one or more sensors such as, without limitation, quantity sensors, pressure sensors, weight sensors, optical sensors, environmental sensors, and/or the like to gauge the amount of deposited CEDs, presence or absence of CEDs, monitor internal conditions such as, without limitation, humidity or temperature within the collection device 200. A processor may also be used to determine the uniqueness of the recycling product after the CED were to be tapped on the processor. A non-limiting example is an NFC reader reading the unique ID of the NFC-enabled CED.

With continued reference to FIG. 2, in a non-limiting example, plurality of sensors may be configured to provide real-time feedback to processor, or even computing device of processing unit 116 at permitted facility 120 as described above, for instance, processing unit 116 may be further configured to send alerts when collection device 200 reaches a per-determined fill level (e.g., 30%, 50%, or 80%) or a time (e.g., daily or weekly), ensuring timely emptying or replacement of collection device 200. In some cases, weight sensor may be configured to detect collection device 200 is nearing its manufactured capacity, integrated computing device may automatically send a notification to permitted facility 120 to schedule a pick-up or replacement.

With continued reference to FIG. 2, after intended use, such collection device 200 may be easily disassembled and recycled or composted. In some embodiments, collection device 200 may be painted or branded with specific colors, logos, or information to indicate its purpose and the entity e.g., permitted facility 120 responsible for its operation and/or further processing. In a non-limiting example, collection device 200 may include a plurality of labels 228a-d affixed to external surfaces of collection device 200. Plurality of labels 228a-d may not only serve as identifiers but also as informative tools for users 112. In some cases, plurality of labels 228a-d may include at least a machine-readable code. In some embodiments, machine readable codes may include QR codes, barcodes, matrix barcodes, PDF417, Qodes, MaxiCodes, and/or the like, when scanned, may provide users 112 with comprehensive details about recycling program as described herein, including instructions for use, types of electronic devices accepted, benefits of participating in the program, destination of deposited CEDs 108 and/or the like. In some cases, QR code, barcodes, matrix barcodes, and/or any readable codes may be linked to dedicated website, application, and/or any user interfaces, offering data related to recycling program such as, without limitation, program statistics, rewards, or incentives for users 112.

With continued reference to FIG. 2, Other embodiments of labels may include RFID (Radio-Frequency Identification) tags, which use electromagnetic fields to automatically identify, and track tags attached to deposited CED, NFC (Near Field Communication) tags for short-range wireless communication, and alphanumeric codes that can be manually entered into a system. In some cases, plurality of labels described herein may be used for tracking the origin, destination, contents, or other relevant data of CEDs, ensuring traceability, authenticity, and efficient data retrieval throughout the recycling process.

With continued reference to FIG. 2, in yet another embodiment, plurality of labels 228*a-d* may include a composition label 228*b*, wherein the composition label informs users 112 about the type of CED accepted in collection device 200. In a non-limiting example, composition label 228*b* may include a label stating: "Accepts aerosol delivery device only." In another non-limiting example, composition label 228*b* may include one or more images of the specified CED instead of textural statements, as shown in FIG. 2.

With continued reference to FIG. 2, in yet another embodiment, plurality of labels 228*a-d* may include instructional and/or environmental impact labels 228*c*. In some cases, labels 228*c* may include step-by-step instruction on how to use collection device 220, such as, without limitation, a label depicting a sequence of images showing a user depositing an aerosol device. In other cases, labels 228*c* may highlight environmental benefits of recycling CEDs, aiming to educate and/or motivate users 112. In a non-limiting example, label 228*c* may include a label stating: "Aerosol delivery device is 94% recyclable."

With continued reference to FIG. 2, in a further embodiment, plurality of labels 228*a-d* may include one or more geographic indicators 228*d* associated with permitted facility 120 as described above. As used in this disclosure, "geographic indicators" refers to symbols, codes, or otherwise markings that provide information about geographical origin, location, or destination of collection device 200 or associated permitted facility 120. In some cases, geographic indicators 228*d* may be in form of any unique identifiers or machine readable codes as described above with reference to FIG. 1, such as, without limitation, QR code, barcode, matrix barcodes, and/or the like, that when scanned, provide users with a map showing location of permitted facility 120. Alternatively, or additionally, geographic indicators 228*d* may include address text, color-coded regions, symbols representing specific cities or states, or even specific latitude and longitude coordinates of the location of permitted facility 120. Collecting plurality of CEDs 108 may include transporting collection device 200 from disposed outlet to processing unit 116 within permitted facility 120 based on one or more geographic indicators 228*d* when predetermined fill level of collection device is reached, and/or a pre-determined duration of time has elapsed via one or more transportation tools/modes e.g., trucks, ships, and/or airplanes.

With continued reference to FIG. 2, other exemplary embodiments of plurality of labels may include, without limitation, safety and warning labels (e.g., labels warning users not to deposit devices with leaking batteries/reservoirs, accompanied by a caution symbol), barcode labels (e.g., labels with barcodes that can be scanned by facility workers to quickly access information about the collection devices, such as capacity, location, or last serviced date), promotional labels (e.g., labels that promote events, campaigns, or initiatives related to CED recycling), sponsorship labels, multilingual labels, and/or even advertisements. As an ordinary person skilled in the art, upon reviewing the entirety of this disclosure, will be aware of various labels may be affixed to external surfaces of collection device 200.

Figure 3:
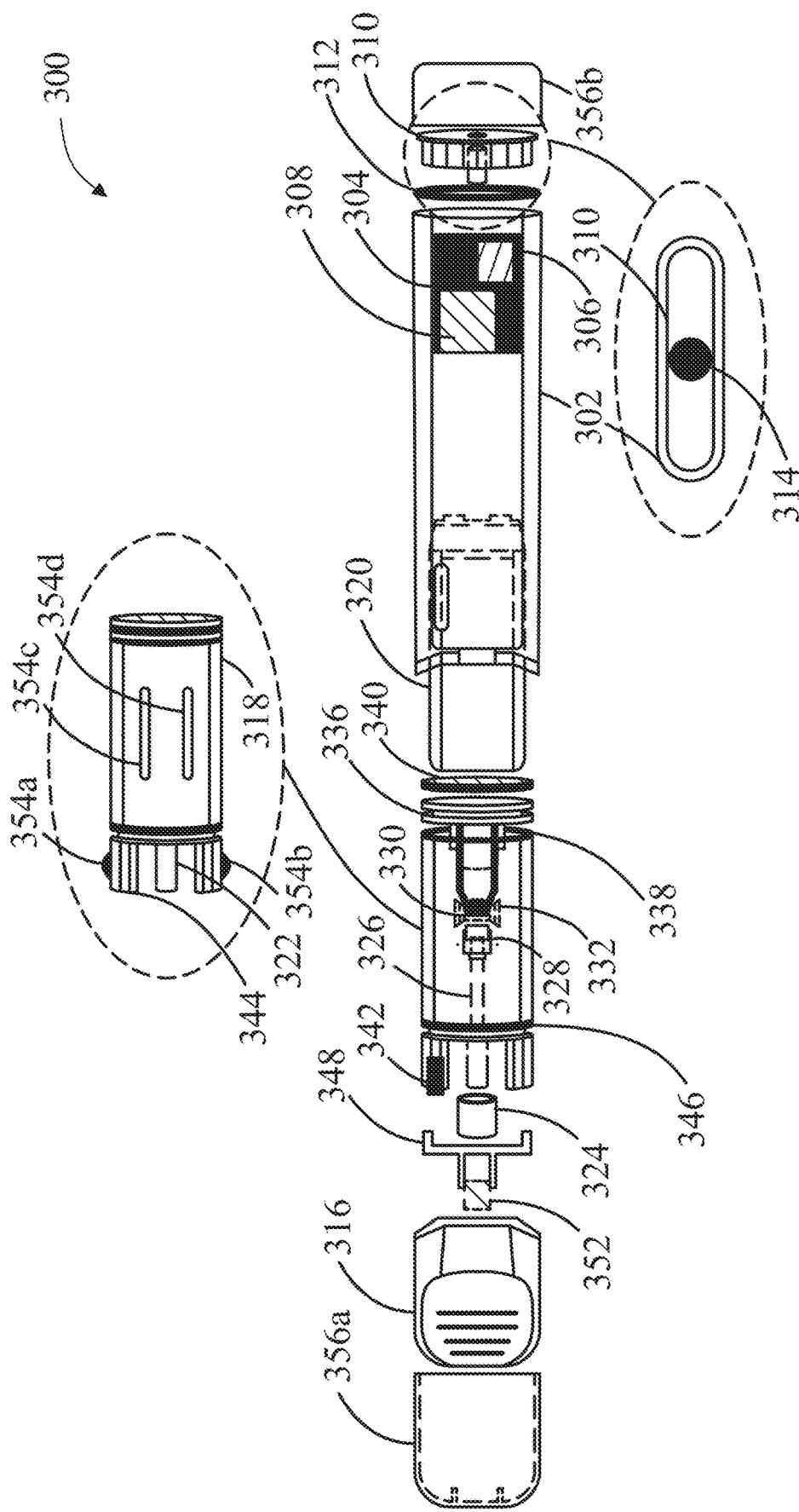
FIG. 3 depicts an exemplary embodiment of an aerosol delivery device in an exploded view.

Now referring to FIG. 3, an exemplary embodiment of an aerosol delivery device 300 is illustrated (in an explosion view). Aerosol delivery device 300 described below may include an aerosol delivery device as disclosed in U.S. patent application Ser. No. 18/211,706, filed on Jun. 20, 2023, and entitled "APPARATUS AND METHOD FOR AEROSOL DELIVERY," which its entirety is incorporated herein by reference.

With continued reference to FIG. 3, aerosol delivery device 300 may include outer body 302. As used in this disclosure, an "outer body" is a container configured to encapsulate a plurality of internal elements of aerosol delivery device 300 such as, without limitation, any elements, components, and/or devices as described in detail below. In some embodiments, outer body 302 may be constructed from an injectable mold. In some cases, plastic material such as, without limitation, BIOGRADE B-M (i.e., blend of thermoplastic starch (TPS), aliphatic polyesters (AP) and natural plasticizers (glycerol and sorbitol)) may be injected into the injectable mold under high pressure, filling the space and taking on the shape of injectable mold. Other exemplary plastic materials may include, without limitation, BIOPAR FG MO (i.e., bio-plastic resin consisting mainly of thermoplastic potato starch, biodegradable synthetic copolyesters and additives), BIOPLAST (i.e., new kind of plasticizer cherfreien thermoplastic material), ENSO RENEW RTP (i.e., renewable, biodegradable, compostable and economic thermoplastic), and/or the like.

With continued reference to FIG. 3, outer body 302 may include PCB 304 containing NFC chip 306 connected with one or more antennas 308 as described above with reference to FIGS. 1-3. One end of outer body 302 may be enclosed by a body base 310. As used in this disclosure, a "body base" is a chassis of aerosol delivery device 300. In some cases, body base 310 may include a body base seal 312, wherein the body base seal 312 is a component that seals the connection between outer body 302 and body base 310, preventing leaks and ensuring proper functioning of aerosol delivery device 300. In a non-limiting example, body base seal 312 may create a tight seal when pressed against bottom of aerosol delivery device 300.

With continued reference to FIG. 3, in other cases, body base 310 may include a base plug 314 connected to PCB 304, wherein the base plug 314 may include, without limitation, a transmitter, a separate PCB, a pressure sensor, a light element, and/or the like; for instance, base plug 314 may include a separate PCB with integrated pressure sensor. For another instance, and without limitation, base plug 314 may also include a base light (e.g., a status indicator continuously indicates one or more status of aerosol delivery device 300). In a non-limiting example, status indicator may include a liquid fill level indicator, internal condition indicator, charging indicator, and/or the like. Additionally, or alternatively, base plug 314 may include a lighting scheme, wherein the lighting scheme may include one or more openings that allow light to shine through. In some cases, lighting scheme may include an opening in a shape of a logo or a shape of an initial of company producing aerosol delivery device 300. Further, a mouthpiece may fit into an opposite end of the end of aerosol delivery device 300 sealed by body base 310.

With continued reference to FIG. 3, aerosol delivery device 300 may include an aerosolizable material reservoir 318. As used in this disclosure, an "aerosolizable material reservoir" is a component of aerosol delivery device 300 configured to hold an aerosolizable material. "Aerosolizable material," for the purpose of this disclosure, is a material that is capable for aerosolization, wherein the aerosolization is a process of intentionally oxidatively converting and suspending particles or a composition in a moving stream of air. Aerosolizable material may include one or more active ingredients and/or chemicals, including without limitation pharmaceutical chemicals, recreational chemicals, flavor-bearing chemicals, and the like. Chemicals may be extracted, without limitation, from plant material, and/or a botanical, such as tobacco or other herbs or blends. Chemicals may be in pure form and/or in combination or mixture with humectants that may or may not be mixed with plant material. In a non-limiting example, aerosolizable material may include E-cigarette liquid, wherein the E-cigarette liquid is a liquid solution or mixture used in aerosol delivery device such as, without limitation, an e-cigarette.

With continued reference to FIG. 3, in some cases, aerosolizable material may include a humectant, wherein the "humectant" may generally refer to as a substance that is used to keep things moist. Humectant may attract and retain moisture in the air by absorption, allowing the water to be used by other substances. Humectants are also commonly used in many tobaccos or botanicals and electronic vaporization products to keep products moist and as vapor-forming medium. Examples may include, without limitation, propylene glycol, sugar polyols such as glycerol, glycerin, honey and the like thereof. Continuing the non-limiting example, E-cigarette liquid may consist a combination of propylene glycol and glycerin (95%), and flavorings, nicotine, and other additives (5%).

With continued reference to FIG. 3, in some embodiments, aerosolizable material held by aerosolizable material reservoir 318 may be replaceable. In a non-limiting example, aerosolizable material reservoir may include a secondary container such as a liquid chamber, wherein the liquid chamber may contain a single type of aerosolizable material. Liquid chamber may be inserted into aerosolizable material reservoir; in other words, aerosolizable material may not be in direct contact with aerosolizable material reservoir. User of aerosol delivery device 300 may switch from a first aerosolizable material to a second aerosolizable material by ejecting a first liquid chamber storing the first aerosolizable material from aerosolizable material reservoir 318 and inserting a second liquid chamber storing the second aerosolizable material into aerosolizable material reservoir 318.

With continued reference to FIG. 3, aerosol delivery device 300 may include a power source 320 e.g., at least one battery component as described above, containing one or more cell chemistries such as, without limitation, lithium cobalt oxide (LCO), lithium nickel cobalt aluminum oxide (NCA), lithium nickel manganese cobalt oxide (NMC), lithium iron phosphate (LFP), and the like; power source 320 may be rechargeable. In some embodiments, power source 320 may be further configured to transmit electric power to elements, components, and/or devices within aerosol delivery device 300 which requires electricity to operate, such as PCB 304 as described above.

With continued reference to FIG. 3, in an embodiment, reservoir 318 and power source 320 (e.g., battery) may be placed within outer body 302, in between mouthpiece 316 and body base 310. In some cases, reservoir 318 may include a channel 322, wherein the channel 322 is a pathway or a passage through which aerosolized material flows. 322 is also encased by a cotton absorption pad 324 (i.e., reservoir cotton), centered around 322. Channel 322 may either be molded into the reservoir as an extension of a vapor tube 326 or may be separate components. Vapor tube 326 may either be molded as part of 112 or be made of a different material and inserted later on. It's function is to transport aerosolized material from the heating chamber to the user. In a non-limiting example reservoir 318 may be in fluidic connection with heating element 330 such as, without limitation, a heating coil (i.e., a wire coil that heated to vaporize the aerosolizable material).

With continued reference to FIG. 3, a vapor channel seal 328 may be placed at the base of vapor tube 326 and encased the sides of heating element 330 to assist controlling of wicking and liquid flow into the heating chamber. Heating element 330 may include a resistive heater configured to thermally contact the aerosolizable material from aerosolizable material reservoir 318. Power source 320 may provide electricity to heating element. In a non-limiting example, using heating element for vaporization of aerosolizable material may be used as an alternative to burning (smoking) which may avoid inhalation of many irritating and/or toxic carcinogenic by-products which may result from pyrolytic processes of burning material such as, without limitation, tobacco or botanical products above 300 degrees C. Heating element may operate at a temperature at/or below 300 degrees C., configured by aerosol generation mechanism 120, controlled by control circuit 116. In a non-limiting example, heating element 330 may include an atomizer and/or a cartomizer.

With continued reference to FIG. 3, a "vapor channel seal," as described herein, is a sealing component in aerosol delivery device 300 that ensures an airtight seal and leak-proof seal within vapor path or airway. In an embodiment, a vapor channel seal 328 may be around the coil assembly (heating element 330). A heating coil cotton 332 may be wrapped around or threaded through the heating coil, ensuring that the aerosolizable material comes into contact with the heated coil when apparatus is activated. Heating coil cotton 332 may absorb aerosolizable material, and as the heating coil heats up, vaporizing the aerosolizable material, which may be then inhaled by the user. In a non-limiting example, heating coil cotton 332 may include a wick. In some cases, vapor channel seal 328 may also be configured to perform the function of wicking/funneling control similar to heating coil cotton 332. Additionally, or alternatively, heating element 330, vapor channel seal 328, and heating coil cotton 332 may be disposed inside reservoir 318 isolated from the aerosolizable material. Further, vapor channel seal 328 may serve as a seal with vapor tube; However, it also forms an aerosolization chamber when vapor channel seal 328 is inserted onto heating element 330 connected with the reservoir base 336 (i.e., liquid chamber deck).

With continued reference to FIG. 3, a reservoir base 336 may connect to reservoir 318. As used in this disclosure, a "reservoir base" refers to the base section of reservoir 318 which connected to heating element 330 (i.e., heating coil) and allows the wicking material such as, without limitation, heating coil cotton 332 to absorb aerosolizable material and deliver it to heating element 330 for vaporization. In a non-limiting example, reservoir base 336 with or without heating element 330, vapor channel seal 328, and/or heating coil cotton 332 attached may be inserted into reservoir 318 in a direction consistent with body base 310, along with a reservoir base seal 338, wherein the reservoir base seal 338 serves to prevent aerosolizable material from leaking out of reservoir 318 onto reservoir base 336 or other internal components such as, without limitation, power source 320, PCB 304, and/or the like. Additionally, or alternatively, a reservoir battery seal 340 may be disposed in between reservoir 318 and power source 320 (i.e., under reservoir base 328 and above power source 320), wherein the reservoir battery seal 340 serve as a secondary protection for power source 320, preventing aerosolizable material from leaking out through reservoir base 336 into power source 320.

With continued reference to FIG. 3, reservoir 318 may include a reservoir fill port seal 342. In an embodiment, reservoir 318 may include a reservoir fill port 344, wherein the reservoir fill port 344 is a small opening on reservoir 318 and/or outer body 302 of aerosol delivery device 300 that allows user to fill reservoir 318 with user-preferred aerosolizable material. In some cases, reservoir fill port may be located on the top of reservoir 318 and covered by reservoir fill port seal 342. As described herein, a "reservoir fill port seal" is a seal that prevents aerosolizable material from leaking out of the reservoir fill port and onto aerosol delivery device 300. In some cases, reservoir fill port seal 342 may include a removable cap or plug. Once reservoir 318 is filled, reservoir fill port seal 342 may be placed into reservoir fill port 344, sealing the reservoir fill port 344 and preventing e-liquid from leaking out.

With continued reference to FIG. 3, reservoir 318 may further include a reservoir seal 346 disposed at the opposite end of reservoir base seal 338. In a non-limiting example, reservoir seal 346 may be placed around reservoir fill port seal 342 and reservoir fill port 344. Snapping of mouthpiece 316 onto reservoir 318 may allow for both airflow management and avoiding condensation to seep out by configuring an airtight seal on top of reservoir 318. Airtight sealing both on top of reservoir 318 through reservoir seal 340 and bottom through reservoir base seal 338 may improve stability of active ingredient filled in reservoir 318 as it avoids contact with air (i.e., potential oxidation).

With continued reference to FIG. 3, cotton absorption pad 324 wrapped around the outlet of channel 322, may be referred to as a "reservoir cotton," as described herein, is a component configured to absorb any excess aerosolizable material may have been vaporized by heating element 330 but not inhaled by the user, preventing any aerosolizable material from entering the user's mouth through mouthpiece 316. Further, cotton stand 348 may also be mechanically connected to mouthpiece 316 and hold a further cotton such as, without limitation, a mouthpiece cotton 352. Mouthpiece cotton 352 may be fixed on top of cotton stand inside mouthpiece 316. In an embodiment, mouthpiece cotton 352 may be in contact with the outlet of mouthpiece 316 and may be used as a filter configured to help prevent aerosolizable material from entering the user's mouth. In some cases, mouthpiece cotton 352 may also help to reduce condensation and improve the overall vaping experience.

With continued reference to FIG. 3, reservoir 318 may include a plurality of alignment features 354*a-d* on the exterior. As used in this disclosure, an "alignment feature" on the exterior of reservoir 318 is a physical feature that helps to precisely and securely align and/or fix reservoir 318 within outer body 302. In a non-limiting example, reservoir 318 may be internally coupled to outer body 302 through plurality of alignment features 354*a-d*. In some cases, alignment feature may include one or more male alignment features 354*a-b*, wherein the male alignment features 354*a-b* may include physical features that projects outwardly from reservoir 318, while the female alignment features 354*c-d* may include corresponding physical feature that is recessed or indented into reservoir 318, designed to receive and align with male alignment features 354*a-b*. In a non-limiting example, reservoir 318 may be inserted into outer body 302 through press fit and/or snap fit. The interior of outer body may include a plurality of alignment features that match plurality of alignment features 354*a-d* on the reservoir 318. For instance, and without limitation, female alignment features 354*c-d* may include windows around reservoir 318, wherein these windows may be configured to fit plurality of male alignment features (e.g., bumps or protrusions) within outer body 302 at a desired location.

With continued reference to FIG. 3, aerosol delivery device 300 may include a top/bottom seal 356*a-b*, wherein the top/bottom seal 356*a-b*. Top seal 356*a* may be placed over (e.g., covering) the mouthpiece 316 while bottom seal 356*b* may be placed over end cap 310 and some portion of outer body 302 towards end cap 310. In some cases, during fluid e.g., air or vaporized aerosolizable material travel tight top/bottom seal 356*a-b*, such seal may help to stabilize the pressure changes and prevent any leakage that may occur. In an embodiment, one or more rubber extrusions/inserts (within top/bottom seal 356*a-b*) may help further create an airtight seal by inserting the extrusions/inserts into connecting components (e.g., mouthpiece 316, end cap 310, and/or the like).

With continued reference to FIG. 3, plurality of plastic components may include, without limitation, outer body 302, mouthpiece 316, reservoir 320, reservoir base 336, reservoir seal 346, cotton stand 348, top seal 356*a*, bottom seal 356*b*, and/or the like. Plastic components described herein may be made of eco-friendly, biodegradable, or otherwise compostable plastic such as, without limitation, plant-based plastic such as polylactic acid (PLA), polyhydroalkanoates (PHAs), polyhydroxy butyrate (PHB), Polyhydroxyvalerate (PHV), polyhydroxy hexanoate (PHH), and the like. In another non-limiting example, such plastic may also include petroleum-based plastics such as polyglycolic acid (PGA), polybutylene succinate (PBS). Polycaprolactone (PCL), polybutylene adipate terephthalate (PBAT), Oxo-degradable polypropylene (oxo-PP), and the like.

With continued reference to FIG. 3. in a non-limiting example, at least one battery component (i.e., power source 320) within outer body 302 may also be eco-friendly by implementing biodegradable electrolytes, as well as replacing non-biodegradable, petroleum-based polymers with those that can easily degrade, thereby minimizing the usage of non-renewable resources in power source 320. By removing metals, using biodegradable polymers, and implementing biodegradable electrolytes, batteries may become biodegradable themselves. However, even if power source 320 is a lithium-ion battery, a fully biodegradable plastic construction can allow the user to take out the battery of the device, recharge it, and reinsert it into a new body while composting or disposing of the old body. In this embodiment, the disposable unit would be biodegradable, and the battery would be recharged by the user and reinserted into a new disposable body. This construction, a form of a rechargeable disposable, may require a battery holder that is insertable into the body and protects the user from handling a battery directly. This construction may have a pair of pins or another method of forming an electrical connection with the heating element upon insertion, rather than being soldered together.

With continued reference to FIG. 3, in a non-limiting example, users 112 may elect to dispose the insertable battery separately in a second collection device designated for collecting battery component only, while being able to throw the biodegradable plastic unit away. In other embodiments, biodegradable plastics described herein may be used to fit a cartridge/rechargeable battery model. If mouthpiece were to be connected to the reservoir and aerosolization chamber, in the form of a cartridge, and that cartridge were to be insertable and detachable of the unit body containing a fixed and rechargeable battery, an electrical connection is required to form between the cartridge at insertion with the body. As user can keep the rechargeable body but would need to continue to buy the disposable cartridges, a cartridge made entirely out of biodegradable plastics would assist the user in not having to recycle the disposable part but yet create a sustainable use for small disposable cartridges.

Now referring to FIGS. 4A-D, an exemplary embodiment of CED collection process 400 is illustrated. In an embodiment, CED collection process 400 may include a Business-to-consumer (B2C) recycling. Users 112 e.g., customers may be provided an opportunity to send back used CEDs in collection device such as, without limitation, a recycling box, container, and/or the like. In another embodiment, Business-to-business (B2B) recycling may be also utilized by working with outlets/retailers and distributors to provide collection device 200 at point of sale (POS), where consumers can return used batteries.

Figure 4A:
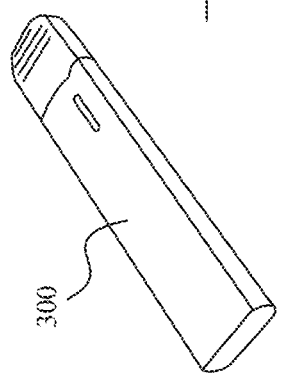
FIGS. 4A-D depict an exemplary embodiment of a consumer electronic device collection process.

FIG. 4A shows an example CED that can be recycled, such as aerosol delivery device 300 as described above with reference to FIG. 3.

Figure 4B:
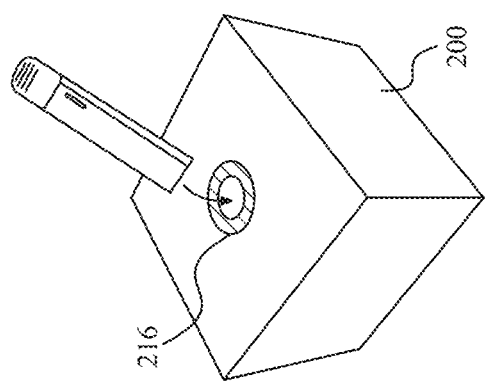

FIG. 4B illustrates (a user) putting the CED as shown in FIG. 4A into collection device 200 as described above with reference to FIG. 2. In some cases, putting the CED e.g., aerosol delivery device 300 may include insert aerosol delivery device 300 through at least an aperture 216 of collection device 200.

Figure 4C:
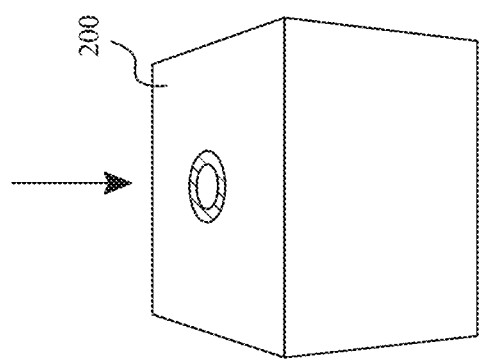

FIG. 4C depicts collection device 200 now containing plurality of CEDs to be recycled. In some cases, plurality of CEDs may be for an entire product category, or for a branded product only.

Figure 4D:
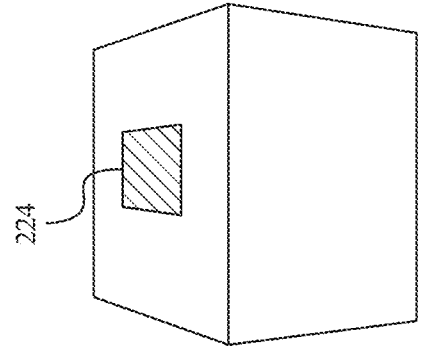

FIG. 4D depicts collection device 200 of being packaged for shipping, by covering at least an aperture 216, using lid component 224, to a recycling facility according to geographic indicator 228d locate on at least an external surface of collection device 200. In other cases, collection process for disclosed recycling program may include direct to consumer shipping labels available upon inquiry. In a non-limiting example, all recyclable CEDs such as, without limitation, battery material may be safely shipped and stored at a warehouse facility, where it may remain until containers are sufficiently filled. As containers fill with used product, batteries may be periodically shipped to a processor for the initiation of the hydro-to-cathode recycling process as described in detail below with reference to FIG. 6 upon receipt.

With continued reference to FIGS. 4A-D, disclosed recycling program may minimize plastic and electric waste by recycling batteries using a state-of-the-art battery recycling center and repurposing other components into useful new materials, e.g., home building materials as described above with reference to FIG. 1.

Figure 5:
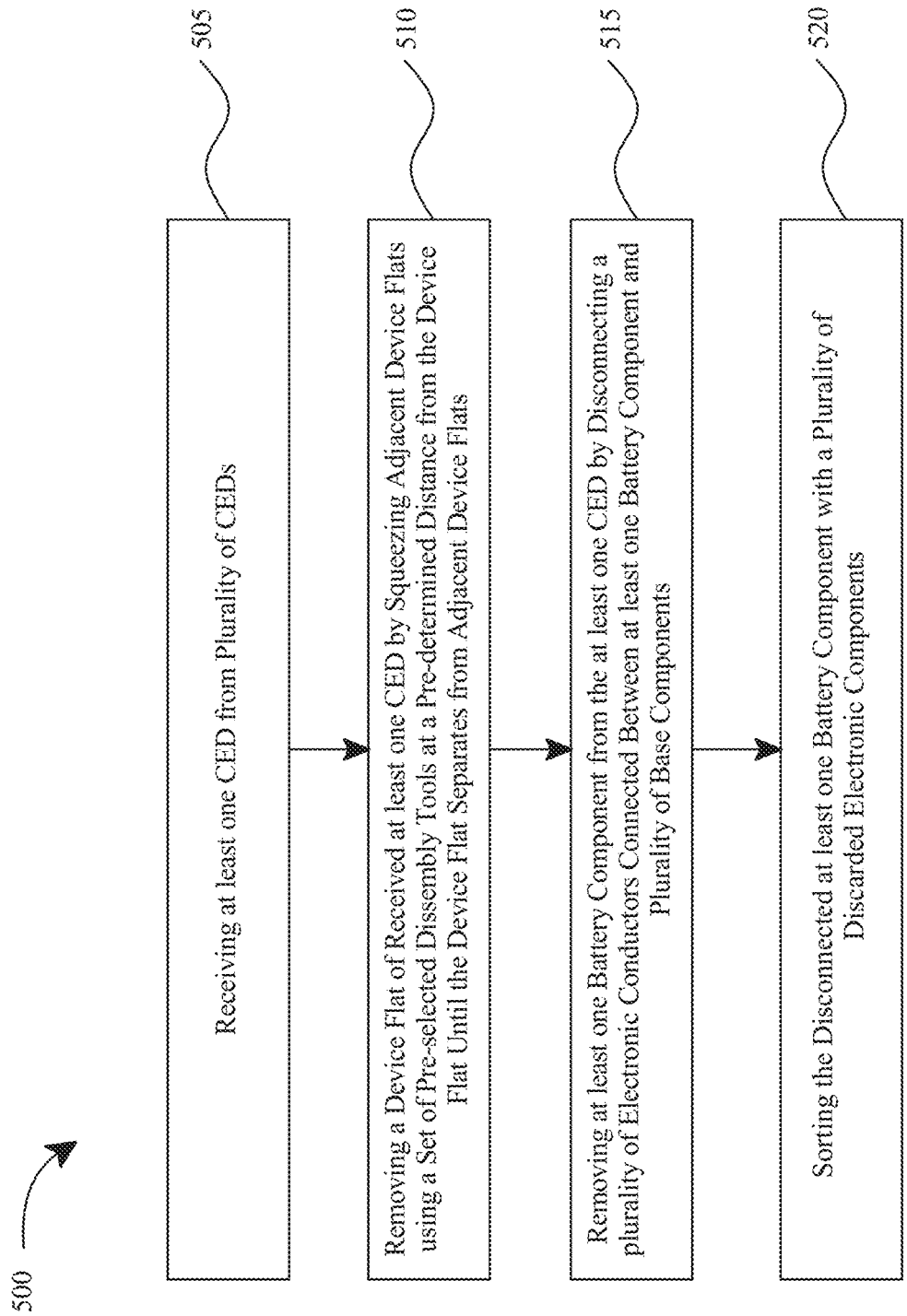
FIG. 5 shows a flow diagram of an exemplary embodiment of an electronic device disassembling process (EDDP)

Now referring to FIG. 5, a flow diagram of an exemplary embodiment of an electronic device disassembling process (EDDP) 500 is illustrated. A CED, such as aerosol delivery device 300 as described above, may be dissembled into plurality of base components 124, such as plastics components 132 and battery components 136 as described above with reference to FIG. 1.

With continued reference to FIG. 5, EDDP 500 may include a step 505 of receiving at least one CED from plurality of CEDs. In some cases, receiving at least one CED may include visually inspecting received at least one CED to ensure it falls within an accepted category of devices and/or conditions for disassembly. For instance, and without limitation, visually inspecting received at least one CED may include checking for specific brand markings, model numbers, or any other identifiable features. In some cases, one or more optical sensors communicatively connected to processing unit 116 such as, without limitation, cameras, may be employed, along with one or more image processing techniques and/or computer vision algorithms such as, without limitation, image segmentation, object recognition, edge detection, image classifications, among others, for automatic visual inspection. One or more machine learning models, such as neural networks as described below with reference to FIG. 10 may be utilized by computing device within processing unit 116 during any inspection process as described herein.

With continued reference to FIG. 5, EDDP 500 may include a step 510 of removing a device flat of received at least one CED by squeezing adjacent device flats using a set of pre-selected disassembly tools at a pre-determined distance from the device flat until the device flat separates from adjacent device flats. In some cases, set of pre-selected disassembly tools may include a plurality of personal protective equipment (PPE) such as, without limitation, gloves, a lab coat or other protective outerwear, eye protection such as goggles, close-toed Shoes, and/or a bench protector. Set of pre-selected disassembly tools may also include, without limitation, pliers, a flathead screwdriver, electrical tape, alcohol wipes, a bench protector, and wire cutter/scissors.

With continued reference to FIG. 5, in a non-limiting example, a set distance, such as 0.5 cm from the bottom of aerosol delivery device, a set of pliers may be used to squeeze the device flat, until the bottom closure separates from the rest of outer body without causing damage to internal components. Further, a flat head screwdriver may be used to remove bottom closure from the rest of outer body, exposing the electronic components such as PCB, NFC, antenna, and/or wires connected in between. Flat head screwdriver may also be used to pull the electronic components out of outer body.

With continued reference to FIG. 5, EDDP 500 may include a step 515 of removing at least one battery component 136 from the CED by disconnecting a plurality of electronic conductors connected between at least one battery component 136 and plurality of base components. In a non-limiting example, disconnecting plurality of electronic conductors may include cutting, using a cutter or scissor, a plurality of wires connected between battery and PCB as described above. In some cases, removing at least one battery component 136 may further include covering a plurality of leads of the disconnected electronic conductors on at least one battery component 136 using an electrical tape, thereby preventing discharge generated from unintended contact with the plurality of discarded electronic components.

With continued reference to FIG. 5, EDDP 500 may include a step 520 of sorting disconnected at least one battery component 136 with a plurality of discarded electronic components. In some cases, sorting battery components may ensure that each battery component is directed to an appropriate recycling or disposal pathway. In an embodiment, sorting at least one battery component 136 may include an integration of an automatic sorting mechanism, wherein the automatic sorting mechanism utilizes a combination of sensors (e.g., spectroscopic sensor, dimensional sensor, weight sensor, RFID sensor, and/or the like), conveyors, actuators to efficiently categorize and segregate battery components that need different treatment.

With continued reference to FIG. 5, requisite data such as, without limitation, battery shape, battery weight, battery dimension, battery capacity, battery state of charge, battery resistance, battery health, and/or the like may be gathered by one or more sensors may be transmitted to processing unit 116 for determination of battery category for each battery component. In some cases, conveyor may then transport categorized battery component to a designated sorting area. In some cases, sorting actuators such as, without limitation, robotic arms, air jets, or diverting gates, may be activated based on an output signaled from processing unit upon digesting requisite data, ensuring each battery component is placed in a correct bin or container at the designated sorting area.

With continued reference to FIG. 5, in a non-limiting example, lithium-ion batteries detected by the system 100 may be directed towards a bin designated for high-value recycling due to the quantity of valuable metals they contain. In contrast, alkaline batteries may be directed towards a separate container for standard recycling. System 100 may incorporate visual recognition systems utilizing a plurality of cameras and machine learning algorithms as described herein to identify battery labels and shapes, impedance spectroscopy to determine the internal structure and state of battery, RFID or barcode scanning if batteries come equipped with such identifiers, among others. Additionally, chemical sensors that may be configured to detect specific signatures associated with particular battery chemistries.

With continued reference to FIG. 5, additionally, or alternatively, EDDP 500 may further include sorting plurality of plastic components 132 with a plurality of discarded plastic components. In some cases, different plastics may have unique infrared signatures. In a non-limiting example, by exposing plurality of plastic components 132 to infrared light and analyzing reflected spectrum, processing unit 116 may identify specific type of plastic. For example, and without limitation, polyethylene (PE) and polyvinyl chloride (PVC) may be distinguished based on their distinct IR spectra. In other cases, plurality of plastic components 132 may be separated based on (density) buoyancy; for instance, and without limitation, plastics such as PET may float in a particular solution, while others like PVC may sink. Other properties, such as, without limitation, color, size, shape, and/or the like may be used to categorize plurality of plastic components 132 as described herein. Sorting plurality of plastic components 132 may be done using automatic sorting mechanism in a similar manner as described above.

With continued reference to FIG. 5, further, processing the plurality of base components 124 may include testing at least one battery component 136 based on a set of pre-defined battery criteria and reusing the at least one battery component as the recycled output as a function of a positive assessment from the testing. As used in this disclosure, a "set of pre-defined battery criteria" refers to a collection of standards or benchmarks that a battery must meet or exceed to be deemed suitable for reuse or repurposing. In some cases, set of pre-defined battery criteria may include, without limitation, the battery's charge retention capacity, its cycle life, structural integrity, absence of any leakage or corrosion, and the efficiency of its internal chemical reactions. In some cases, testing at least one battery component 136 may include, without limitation, charge-discharge cycling to determine the battery's capacity and efficiency, visual inspections for any signs of physical damage or wear, electrical tests to measure resistance and voltage stability, chemical tests to check for any potential internal degradation or contamination, and/or the like.

With continued reference to FIG. 5, in a non-limiting example, lithium-ion battery extracted from CED may undergo a series of charge-discharge cycles. If the battery retains above 80% of its original capacity and passes all other criteria, it may be repurposed for use in lower-demand applications, such as, without limitation, remote controls or digital clocks, thereby extending its useful life and reducing the need for new battery production. In another non-limiting example, any tests performed during manufacturing and/or quality control, as disclosed in U.S. patent application Ser. No. 18/211,726, may also be performed during processing at least one battery component 136 as described herein.

With continued reference to FIG. 5, it should be noted that, while one method of disassembly is disclosed, other methods of disassembly for recycling may be possible and contemplated based on the specific mechanical characteristics of plurality of CEDs. As an ordinary person skilled in the art, upon reviewing the entirety of this disclosure, will be aware of various EDDP processing unit 116 at permitted facility 120 may be employed for recycling CEDs.

Figure 6:
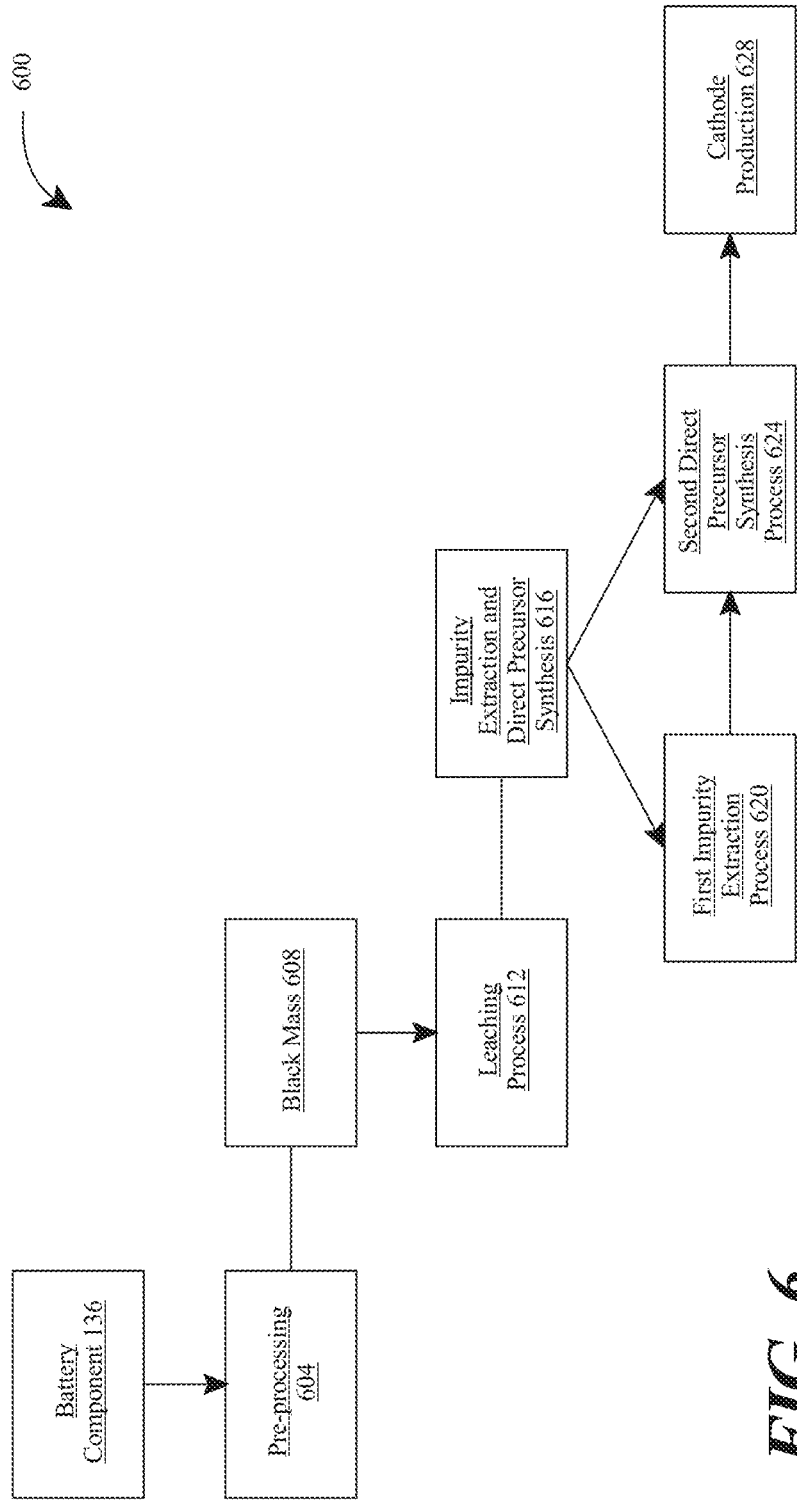
FIG. 6 shows a flow diagram of an exemplary embodiment of recycling plurality of electrochemical materials.

Now referring to FIG. 6, a flow diagram of an exemplary embodiment of recycling plurality of electrochemical materials 600 is illustrated. In a non-limiting example, recycling plurality of electrochemical materials may include applying a Hydro-to-cathode™ recycling process to at least one battery component 136, developed by ASCEND ELEMENTS. In some cases, Hydro-to-cathode™ recycling process may combine hydro and direct recycling, while avoiding toxic waste and emissions from upstream processes. In an embodiment, Hydro-to-cathode™ recycling process may convert streams of mixed electrochemical materials directly into a single cathode chemistry product, elevating critical battery elements to their desired level of value.

With continued reference to FIG. 6, in a non-limiting example, Hydro-to-cathode™ recycling process may be input material agnostic, and result in ~59% loser cost and ~93% cleaner than traditional processes such as, without limitation, traditional hydrometallurgy, pyrometallurgy recycling process, and/or the like. By utilizing this method, certain percentage of all battery components may be recycled into new materials, energy, or directly into new batteries, reducing landfill waste, and helping to mitigate the harmful social and environmental impact of mining. Materials are used to upcycle into new batteries, and old batteries are used to recharge them if good for use in new product.

With continued reference to FIG. 6, process 600 may include a pre-processing 604 e.g., dismantling, discharging, and/or shredding received at least one battery component 136 (i.e., used battery). In a non-limiting example, at least one battery component 136 may be first dismantled to separate cathode from other components. Mechanical processes such as shredding or crushing may be performed by processing unit 116 to produce a plurality of black mass 608.

With continued reference to FIG. 6, As used in this disclosure, "black mass" refers to the residual substance that remains after spent battery components e.g., lithium-ion batteries have been processed for recycling. In a non-limiting example, after the outer casings, anodes, and electrolytes of batteries are removed, remaining cathode material, which is a mixture of metals such as, without limitation, Nickel, Lithium, Cobalt, manganese, lithium, and/or the like may be termed as "black mass." In some cases, black mass 608 may include a dark and powdery appearance.

With continued reference to FIG. 6, other exemplary electrochemical materials besides black mass 608 may include, without limitation, copper foil, aluminum foil, styrene-butadiene polymer, 1.1-difluoroethylene polymer, and/or the like as described below with reference to FIG. 7.

With continued reference to FIG. 6, process 600 may include a leaching process 612. A "leaching process," for the purpose of this disclosure, is a process wherein plurality of electrochemical materials may be immersed in a solution e.g., an acid that dissolves valuable materials such as black mass 608 as described above.

With continued reference to FIG. 6, process 600 may include an impurity extraction and direct precursor synthesis 616. As used in this disclosure, an "impurity extraction and direct precursor synthesis" refers to a two-fold process having a first impurity extraction process 620 and a second direct precursor synthesis process 624. First impurity extraction process 620 may involve removing unwanted contaminants or impurities from a given material, for insurance, and without limitation, unwanted metal alloys or other foreign substances that may degrade the quality of the recovered metals. Once impurities are extracted, purified material may then be directly converted into a precursor form (i.e., second direct precursor synthesis process 624), which may be readily used in production of new products e.g., new batteries including, without limitation, new battery electrodes, especially cathodes. In a non-limiting example, purified lithium, cobalt, nickel, and other metals may be synthesized directly into a compound like lithium nickel cobalt manganese oxide (NMC), which is a common cathode material in lithium-ion batteries. Other exemplary outputs may include, without limitation, graphite, NMC cathode precursor (PCAM), and/or the like.

With continued reference to FIG. 6, in a non-limiting example, Recycling described herein may capture 98% of nickel and cobalt from at least one battery component as described above, and up to 90% of lithium, which may directly use for PCAM and CAM production as described herein. These values are significantly above mandatory minimum levels of reclaimed battery materials through recycling as set by the European Union. By helping to produce cathodes through recycling, disclosed system 100 and method may actively mitigate the harmful impact of mining while also keeping potentially harmful substances out of the environment.

With continued reference to FIG. 6, process 600 may include a cathode production step 628, wherein the cathode production may involve utilization of the synthesized precursors, such as PCAM as described above, to fabricate cathode material suitable for integration into new lithium-ion batteries. In some cases, cathode production process may include various stages, including, without limitation, slurry preparation, wherein the synthesized PCAM are mixed with binders and solvents to create a uniform paste, wherein the paste may be then coated onto a current collector (typically made of aluminum) using techniques such as lot die coating, doctor blade, or spray coating. Once coated, material may undergo a drying process to remove solvents, followed by calendaring to achieve a desired thickness and density. The resultant cathode material may be subjected to a series of tests to ensure its electrochemical performance, safety, and consistency.

With continued reference to FIG. 6, In some embodiments, cathode production 628 may further include additional treatments, such as, without limitation, high-temperature sintering or annealing, may be applied to enhance the structural integrity and performance of the cathode. In a non-limiting example, cathode production may produce a cathode material that is ready for assembly into battery cells, ensuring high energy density, long cycle life, and desired performance in real-world applications e.g., CEDs as described above.

Figure 7:
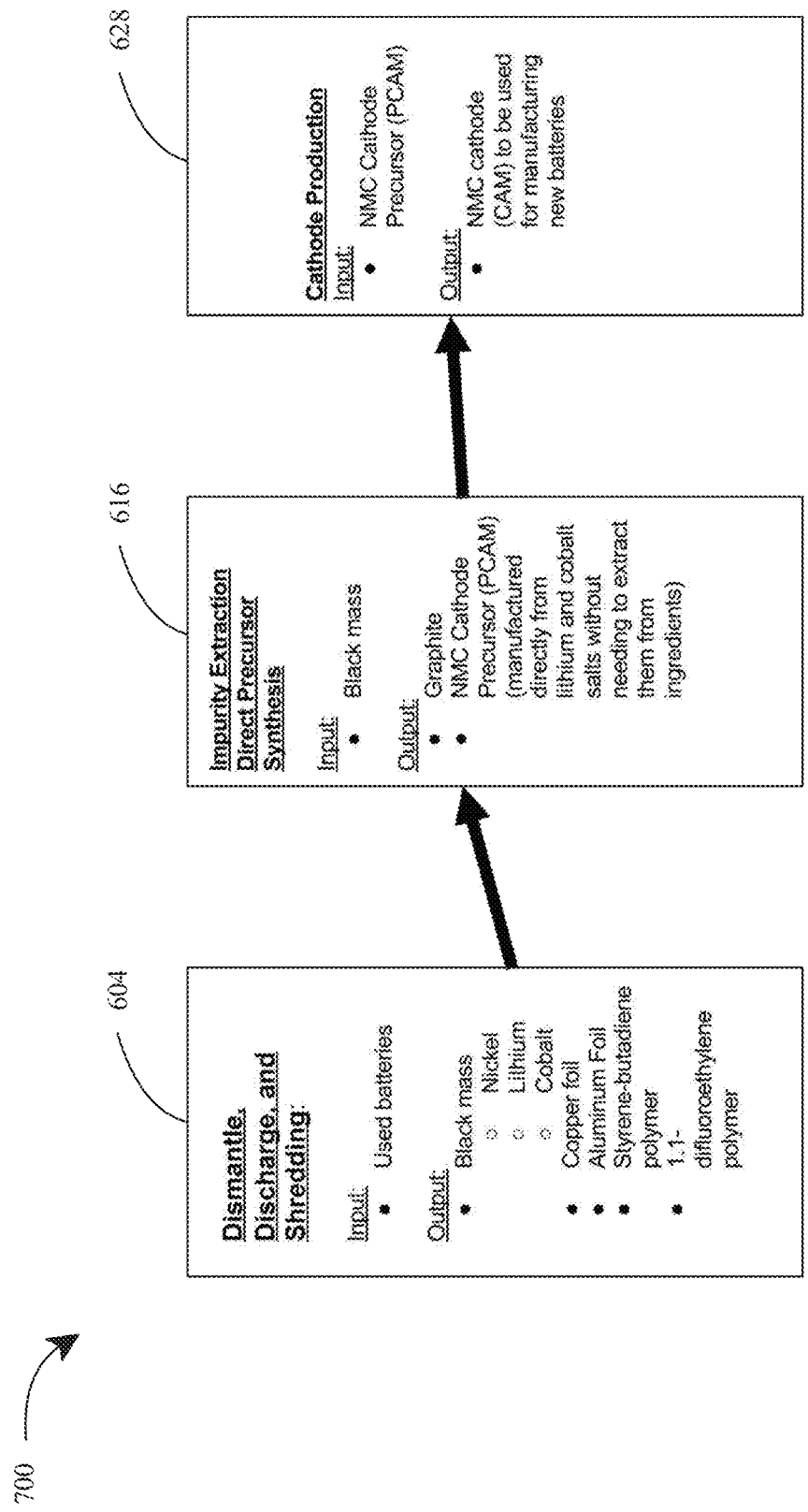
FIG. 7 shows a high-level flowchart of a recycling input and output of batteries from a consumer device.

Now referring to FIG. 7, a high-level flowchart 700 of a recycling input and output of battery component from a CED is illustrated, according to one embodiment. In pre-processing step 604 i.e., dismantle, discharge, and shredding stage, input may be used batteries and output may be black mass (e.g., Nickel, Lithium, and Cobalt); Copper foil; Aluminum Foil; Styrene-butadiene polymer; and/or 1.1-difluoroethylene polymer.

With continued reference to FIG. 7, in the Impurity Extraction Direct Precursor Synthesis stage 616, the input may be black mass and output may be Graphite and NMC Cathode Precursor (PCAM) (manufactured directly from lithium and cobalt salts without needing to extract them from ingredients).

With continued reference to FIG. 7, in the Cathode Production stage 628, the input may be NMC Cathode Precursor (PCAM), and output may be NMC cathode (CAM) to be used for manufacturing new batteries.

Now referring to FIG. 8, a table 800 of ingredients in batteries is illustrated, according to one embodiment. In some cases, electrolyte solvents may also be recycled via process 600 as described above. In some embodiments, electrolyte may be returned back into battery grade product to be used in production of new batteries. In other embodiments, the electrolyte solvents may be recycled through permitted facility 120 such as burn to energy facilities.

Figure 9:
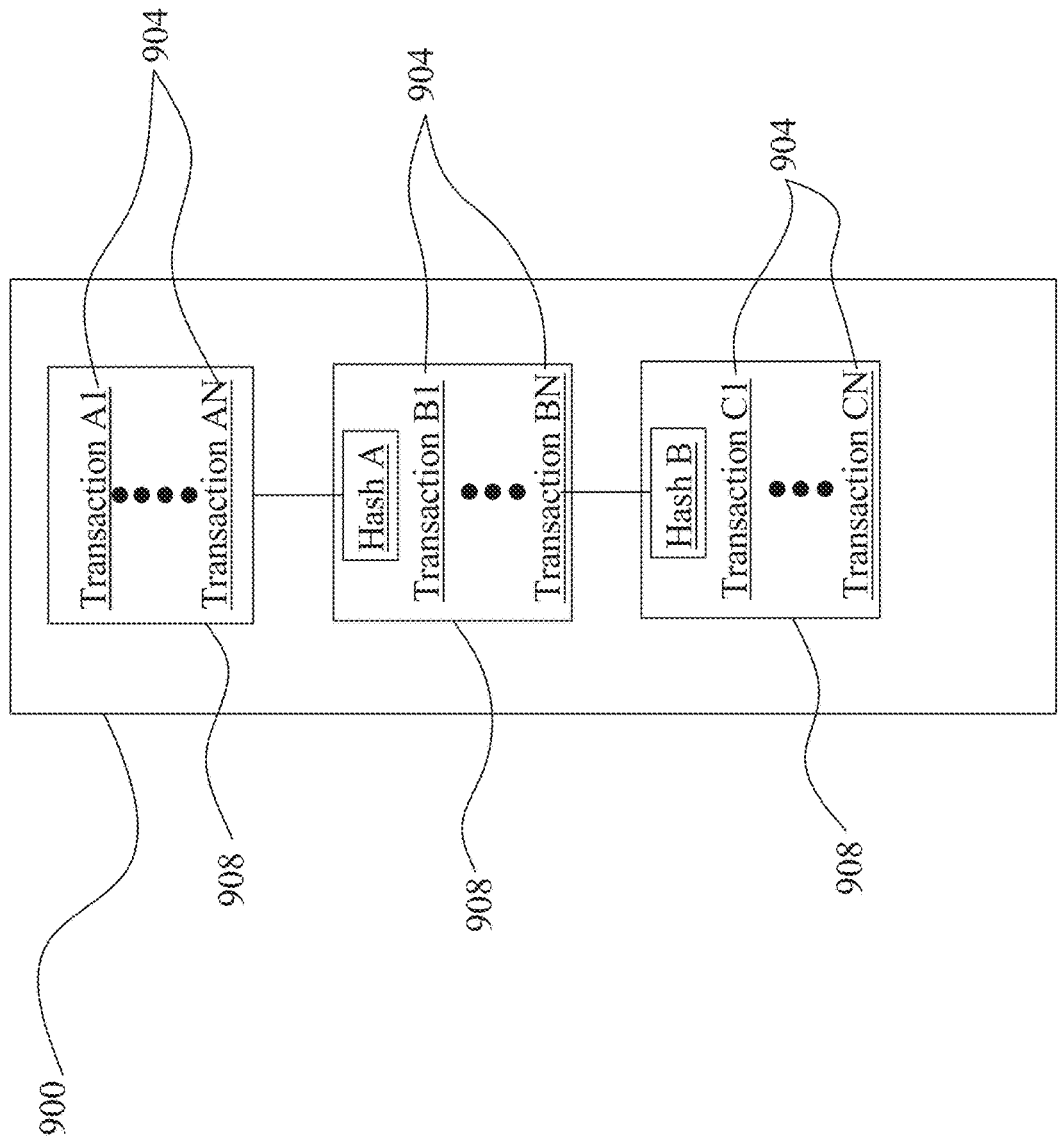
FIG. 9 is an exemplary embodiment of an immutable sequential listing.

Referring now to FIG. 9, an exemplary embodiment of an immutable sequential listing is illustrated. Data elements listed in immutable sequential listing may include any form of data, including textual data, image data, encrypted data, cryptographically hashed data, and the like. Data elements may include, without limitation, one or more at least a digitally signed assertions. In one embodiment, a digitally signed assertion 904 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 904. In an embodiment, collection of textual data states that the owner of a certain transferable item represented in a digitally signed assertion 904 register is transferring that item to the owner of an address. A digitally signed assertion 904 may be signed by a digital signature created using the private key associated with the owner's public key, as described above.

With continued reference to FIG. 9, a digitally signed assertion 904 may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 904 may describe the transfer of a physical good; for instance, a digitally signed assertion 904 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 904 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 9, in one embodiment, an address is a textual datum identifying the recipient of virtual currency or another item of value in a digitally signed assertion 904. In some embodiments, address is linked to a public key, the corresponding private key of which is owned by the recipient of a digitally signed assertion 904. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 904 may record a subsequent a digitally signed assertion 904 transferring some or all of the value transferred in the first a digitally signed assertion 904 to a new address in the same manner. A digitally signed assertion 904 may contain textual information that is not a transfer of some item of value in addition to, or as an alternative to, such a transfer. For instance, as described in further detail below, a digitally signed assertion 904 may indicate a confidence level associated with a distributed storage node as described in further detail below.

With continued reference to FIG. 9, in an embodiment, immutable sequential listing records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

With continued reference to FIG. 9, immutable sequential listing may preserve the order in which the at least a posted content took place by listing them in chronological order; alternatively or additionally, immutable sequential listing may organize digitally signed assertions 904 into sub-listings 908 such as "blocks" in a blockchain, which may be themselves collected in a temporally sequential order; digitally signed assertions 904 within a sub-listing 908 may or may not be temporally sequential. The ledger may preserve the order in which at least a posted content took place by listing them in sub-listings 908 and placing the sub-listings 908 in chronological order. The immutable sequential listing may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 9, immutable sequential listing, once formed, may be inalterable by any party, no matter what access rights that party possesses. For instance, immutable sequential listing may include a hash chain, in which data is added during a successive hashing process to ensure non-repudiation. Immutable sequential listing may include a block chain. In one embodiment, a block chain is immutable sequential listing that records one or more new at least a posted content in a data item known as a sub-listing 908 or "block." An example of a block chain is the BITCOIN block chain used to record BITCOIN transactions and values. Sub-listings 908 may be created in a way that places the sub-listings 908 in chronological order and link each sub-listing 908 to a previous sub-listing 908 in the chronological order so that any computing device may traverse the sub-listings 908 in reverse chronological order to verify any at least a posted content listed in the block chain. Each new sub-listing 908 may be required to contain a cryptographic hash describing the previous sub-listing 908. In some embodiments, the block chain contains a single first sub-listing 908 sometimes known as a "genesis block."

Still referring to FIG. 9, the creation of a new sub-listing 908 may be computationally expensive; for instance, the creation of a new sub-listing 908 may be designed by a "proof of work" protocol accepted by all participants in forming the immutable sequential listing to take a powerful set of computing devices a certain period of time to produce. Where one sub-listing 908 takes less time for a given set of computing devices to produce the sub-listing 908 protocol may adjust the algorithm to produce the next sub-listing 908 so that it will require more steps; where one sub-listing 908 takes more time for a given set of computing devices to produce the sub-listing 908 protocol may adjust the algorithm to produce the next sub-listing 908 so that it will require fewer steps. As an example, protocol may require a new sub-listing 908 to contain a cryptographic hash describing its contents; the cryptographic hash may be required to satisfy a mathematical condition, achieved by having the sub-listing 908 contain a number, called a nonce, whose value is determined after the fact by the discovery of the hash that satisfies the mathematical condition. Continuing the example, the protocol may be able to adjust the mathematical condition so that the discovery of the hash describing a sub-listing 908 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 908 according to the protocol is known as "mining." The creation of a new sub-listing 908 may be designed by a "proof of stake" protocol as will be apparent to those skilled in the art upon reviewing the entirety of this disclosure.

Continuing to refer to FIG. 9, in some embodiments, protocol also creates an incentive to mine new sub-listings 908. The incentive may be financial; for instance, successfully mining a new sub-listing 908 may result in the person or entity that mines the sub-listing 908 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 908 Each sub-listing 908 created in immutable sequential listing may contain a record or at least a posted content describing one or more addresses that receive an incentive, such as virtual currency, as the result of successfully mining the sub-listing 908.

With continued reference to FIG. 9, where two entities simultaneously create new sub-listings 908, immutable sequential listing may develop a fork; protocol may determine which of the two alternate branches in the fork is the valid new portion of the immutable sequential listing by evaluating, after a certain amount of time has passed, which branch is longer. "Length" may be measured according to the number of sub-listings 908 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 908 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing.

Still referring to FIG. 9, additional data linked to at least a posted content may be incorporated in sub-listings 908 in the immutable sequential listing; for instance, data may be incorporated in one or more fields recognized by block chain protocols that permit a person or computer forming a at least a posted content to insert additional data in the immutable sequential listing. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 9, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 908 in a block chain computationally challenging; the incentive for producing sub-listings 908 may include the grant of new crypto-currency to the miners. Quantities of crypto-currency may be exchanged using at least a posted content as described above.

Figure 10:
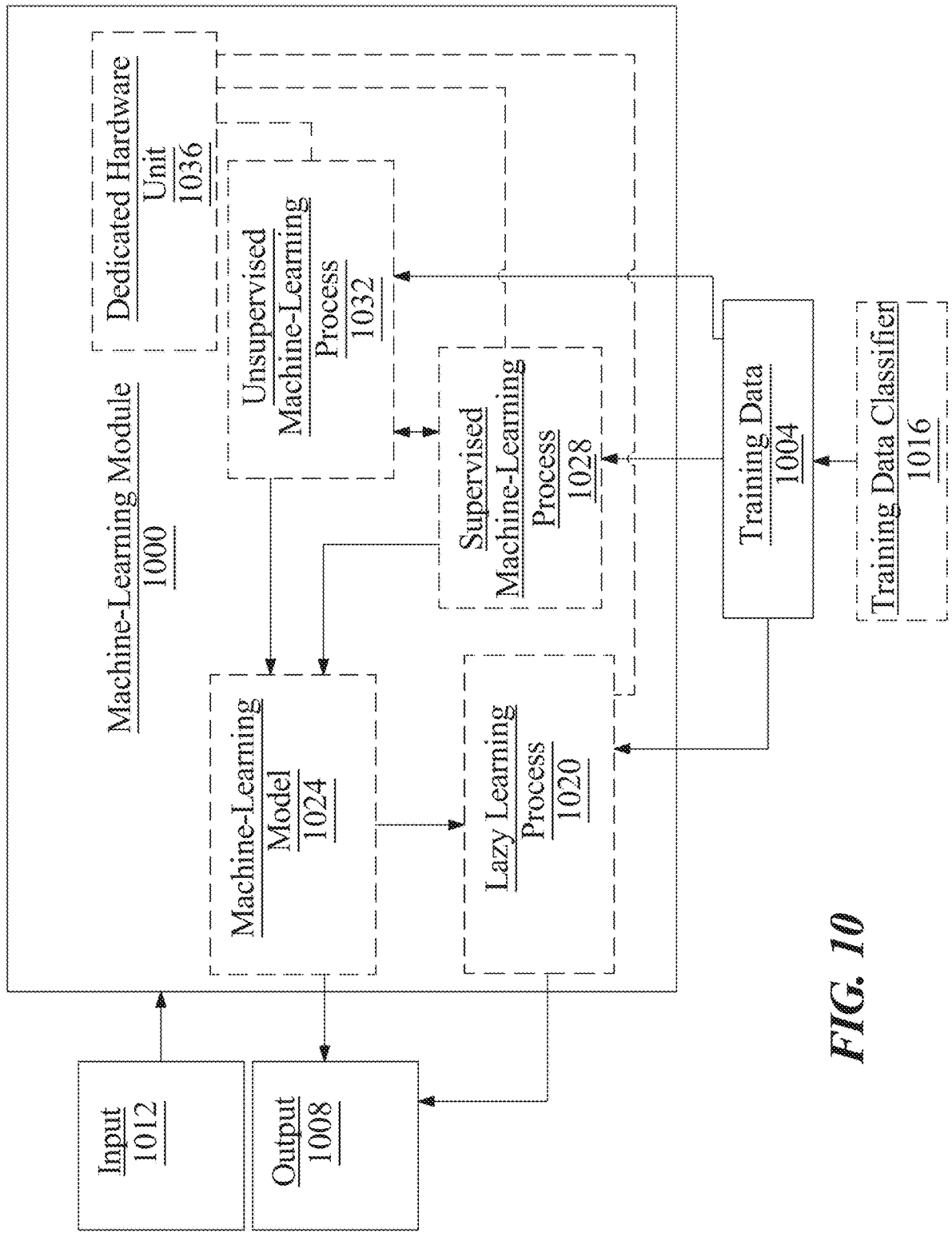
FIG. 10 is a block diagram of an exemplary embodiment of a machine-learning module.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm instantiated in hardware or software logic, data structures, and/or functions that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example, machine learning models that are used to categorize battery components may be trained using battery category training data, wherein the battery category training data may include, without limitation, a plurality of image data describing a plurality of battery components and associated metadata as input correlated to a plurality of battery category as output.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or unique identifiers associated therewith. A classifier may be configured to output at least a datum that unique identifiers or otherwise identifies a set of data that are clustered together, found to be close under a distance metric as described below, or the like. A distance metric may include any norm, such as, without limitation, a Pythagorean norm. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With further reference to FIG. 10, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 10, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 10, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

As a non-limiting example, and with further reference to FIG. 10, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 10, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 10, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to cleanup side-effects of compression.

Further referring to FIG. 10, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 10, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include device manufacture data as described above as inputs, battery category as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

With further reference to FIG. 10, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 10, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1032 may not require a response variable; unsupervised processes 1032 may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 10, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 10, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 10, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Still referring to FIG. 10, redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 10, one or more processes or algorithms described above may be performed by at least a dedicated hardware unit 1036. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 1036 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1036 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 1036 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 11:
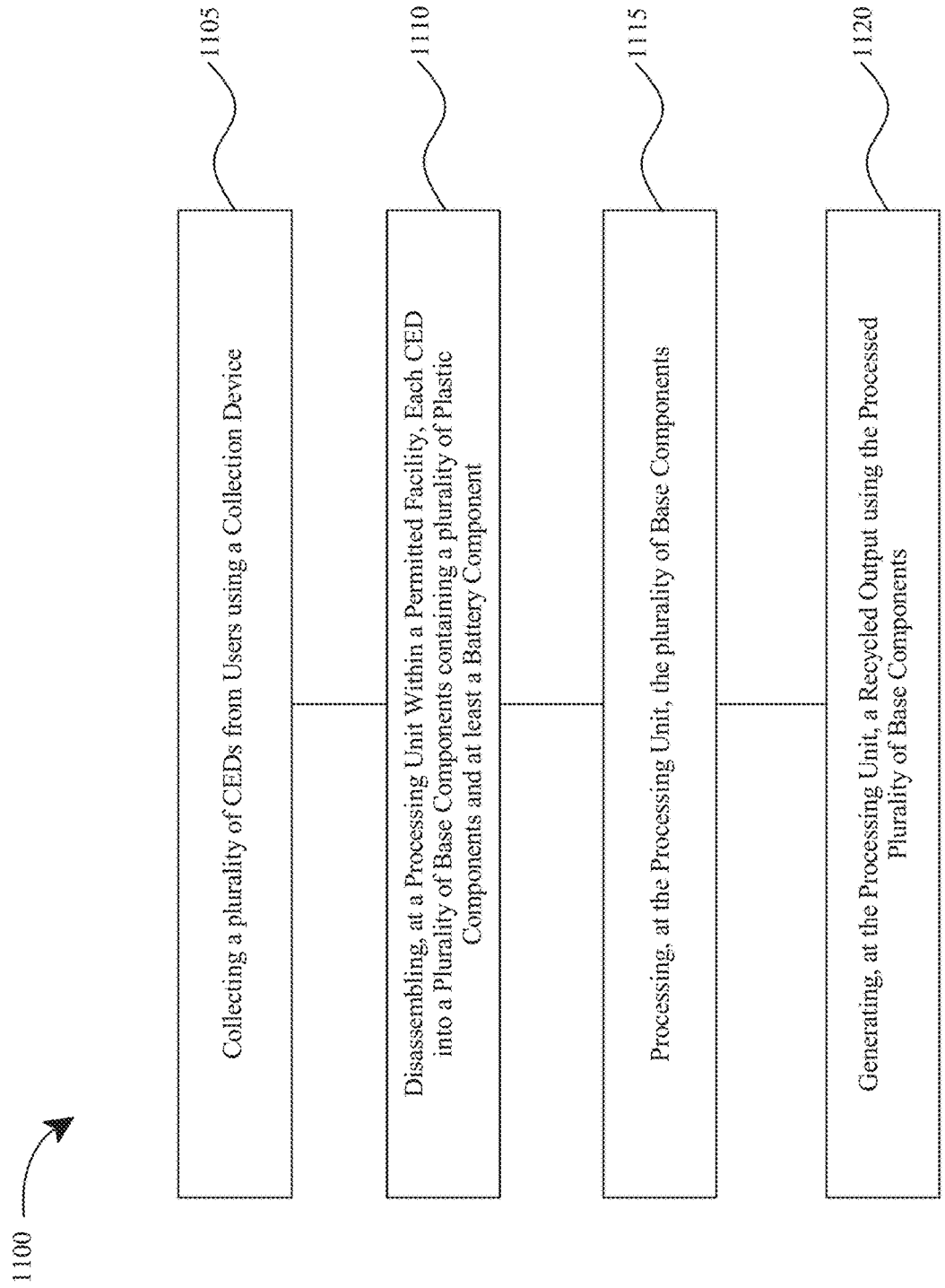
FIG. 11 depicts a flow diagram of an exemplary method for initiating a recycling program of consumer electronic device.

Now referring to FIG. 11, a flow diagram of an exemplary embodiment of a method 1100 of initiating a recycling program of consumer electronic devices is illustrated. Method 1100 includes a step 1105 of collecting, using a collection device, a plurality of consumer electronic devices from users. This may be implemented, without limitation, as described above with reference to FIGS. 1-10.

With continued reference to FIG. 11, method 1100 includes a step 1110 of disassembling, at a processing unit within a permitted facility, each consumer electronic device of the plurality of consumer electronic devices into a plurality of base components through an electronic device disassembling process, wherein the plurality of base components includes a plurality of plastic components and at least one battery component. This may be implemented, without limitation, as described above with reference to FIGS. 1-10.

With continued reference to FIG. 11, method 1100 includes a step 1115 of processing, at the processing unit, the plurality of base components, wherein processing the plurality of base components includes disintegrating the plurality of plastic components into a plurality of granules and decomposing the at least one battery component into a plurality of electrochemical materials. This may be implemented, without limitation, as described above with reference to FIGS. 1-10.

With continued reference to FIG. 11, method 1100 includes a step 1120 of generating, at the processing unit, a recycled output using the processed plurality of base components. This may be implemented, without limitation, as described above with reference to FIGS. 1-10.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
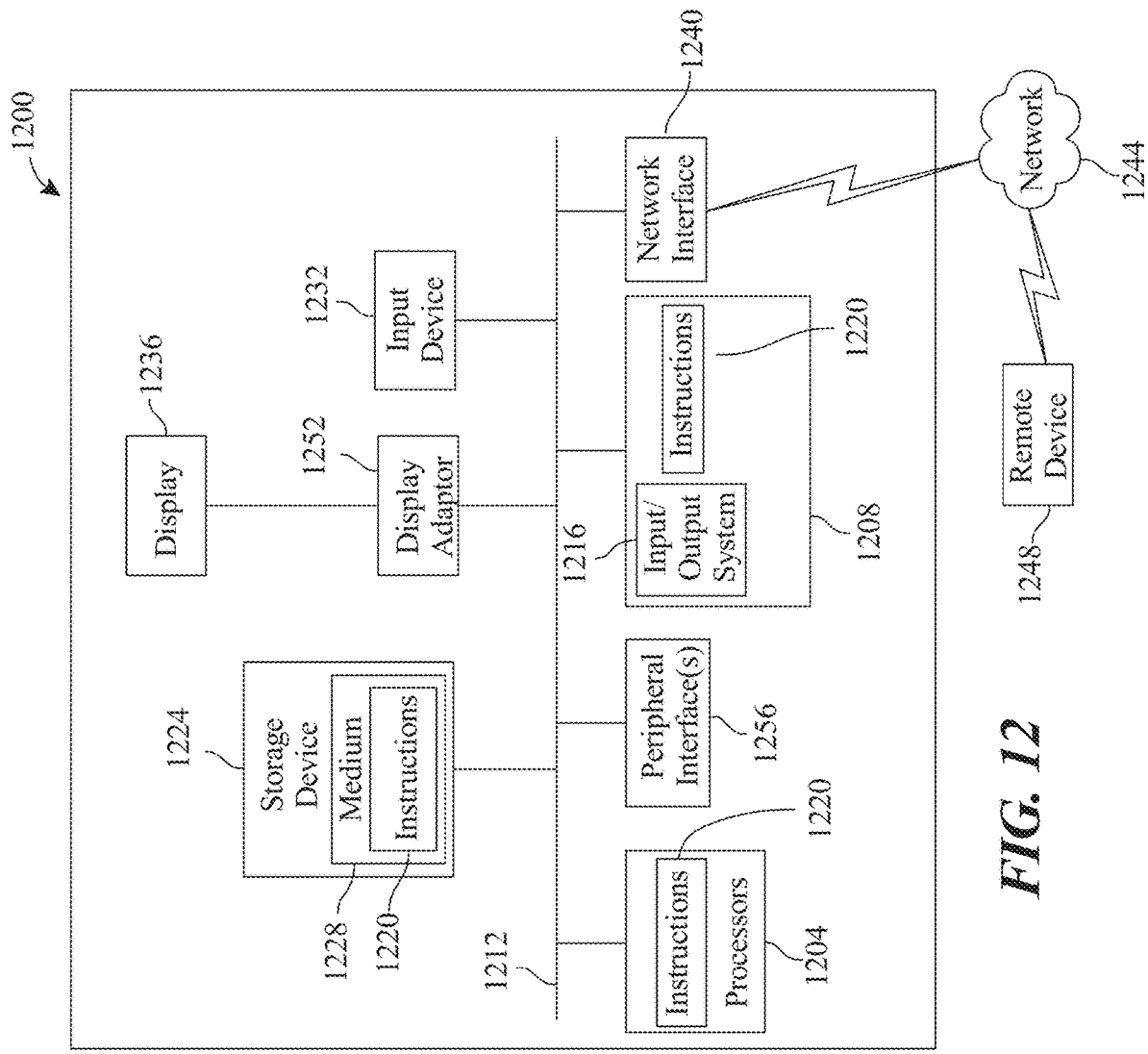
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method of initiating a recycling program of consumer electronic devices, wherein the method comprises:
    collecting, using a collection device, a plurality of consumer electronic devices from users;
    disassembling, at a processing unit within a permitted facility, each consumer electronic device of the plurality of consumer electronic devices into a plurality of base components through an electronic device disassembling process, wherein:
        the plurality of base components comprises:
            a plurality of plastic components; and
            at least one battery component; and
        disassembling comprises:
            receiving at least one consumer electronic device from the plurality of consumer electronic devices;
            removing a device flat of the received at least one consumer electronic device by squeezing adjacent device flats using a set of pre-selected disassembly tools at a pre-determined distance from the device flat until the device flat separates from adjacent device flats;
            removing the at least one battery component from the consumer electronic device by disconnecting a plurality of electronic conductors connected between the at least one battery component and the plurality of base components; and
            sorting the disconnected at least one battery component with a plurality of discarded electronic components;
    processing, at the processing unit, the plurality of base components, wherein processing the plurality of base components comprises:
        disintegrating the plurality of plastic components into a plurality of granules; and
        decomposing the at least one battery component into a plurality of electrochemical materials; and
    generating, at the processing unit, a recycled output using the processed plurality of base components.

2. The method of claim 1, wherein the plurality of consumer electronic devices comprises a plurality of aerosol delivery devices.

3. The method of claim 1, wherein the collection device comprises:
    a housing having an enclosed volume, wherein the housing is configured to:
        receive the plurality of consumer electronic devices from users; and
        store the received plurality of consumer electronic devices,
    at least an aperture located on at least a portion of the housing, wherein:
        the at least an aperture comprises a closure mechanism adjacent to the at least a portion of the housing, wherein the closure mechanism is configured to:
            prevent unauthorized access to the enclosed volume while allowing the plurality of consumer electronic devices to be deposited through the at least an aperture; and
    a lid component pivotally attached to the housing, wherein the lid component is configured to selectively cover and uncover the at least an aperture, thereby enabling a secure containment of the plurality of consumer electronic devices within the enclosed volume.

4. The method of claim 1, wherein the collection device further comprises a plurality of labels affixed to external surfaces of the collection device, wherein the plurality of labels comprises a machine-readable code.

5. The method of claim 4, wherein the machine-readable code comprises at least a QR code encoded with information related to the recycling program.

6. The method of claim 4, wherein the plurality of labels further comprises a geographic indicator associated with the permitted facility.

7. The method of claim 6, wherein collecting the plurality of consumer electronic devices comprises:
disposing the collection device at an outlet; and
transporting the collection device from the outlet to the processing unit within the permitted facility based on the geographic indicator when a predetermined fill level of the collection device is reached, and a pre-determined duration of time has elapsed.

8. The method of claim 1, further comprising:
generating at least one token upon a collection of at least one consumer electronic device of the plurality of consumer electronic devices; and
rewarding the at least a token to the users.

9. The method of claim 8, wherein the at least one token comprises at least one Non-Fungible Token (NFT).

10. The method of claim 1, wherein the set of pre-selected disassembly tools comprises a plurality of personal protective equipment.

11. The method of claim 1, wherein removing the at least one battery component further comprises:
covering a plurality of leads of the disconnected plurality of electronic conductors on the at least one battery component using electrical tape, thereby preventing discharge generated from unintended contact with the plurality of discarded electronic components.

12. The method of claim 1, wherein sorting the at least one battery component with the plurality of discarded electronic components comprises identifying a battery category associated with the at least one battery component.

13. The method of claim 1, wherein the electronic device disassembling process further comprises sorting the plurality of plastic components with a plurality of discarded plastic components.

14. The method of claim 1, wherein processing the plurality of base components comprises:
testing the at least one battery component based on a set of pre-defined battery criteria; and
reusing the at least one battery component as the recycled output as a function of a positive assessment from the testing.

15. A system for initiating a recycling program of consumer electronic devices, wherein the system comprises:
a collection device configured to collect a plurality of consumer electronic devices from users;
a processing unit located within a permitted facility, communicatively connected to the collection device, wherein the processing unit is configured to:
disassemble each consumer electronic device of the plurality of consumer electronic devices into a plurality of base components through an electronic device disassembling process, wherein:
the plurality of base components comprises:
a plurality of plastic components; and
at least one battery component; and
disassembling comprises:
receiving at least one consumer electronic device from the plurality of consumer electronic devices;
removing a device flat of the received at least one consumer electronic device by squeezing adjacent device flats using a set of pre-selected disassembly tools at a pre-determined distance from the device flat until the device flat separates from adjacent device flats;
removing the at least one battery component from the consumer electronic device by disconnecting a plurality of electronic conductors connected between the at least one battery component and the plurality of base components; and
sorting the disconnected at least one battery component with a plurality of discarded electronic components;
process the plurality of base components, wherein processing the plurality of base components comprises:
disintegrating the plurality of plastic components into a plurality of granules; and
decomposing the at least one battery component into a plurality of electrochemical materials; and
generate a recycled output using the processed plurality of base components.

* * * * *